US012779281B2

(12) United States Patent
Federko et al.

(10) Patent No.: US 12,779,281 B2
(45) Date of Patent: Nov. 3, 2026

(54) IMAGE-BASED SPATIAL MODELING OF ALIGNMENT DEVICES TO AID GOLFERS FOR GOLF SHOT ALIGNMENTS

(71) Applicant: AlignAI, LLC, Clayton, MO (US)

(72) Inventors: Dusty Federko, St. Louis, MO (US); Ben Rodenberg, Roeland Park, KS (US); JM Bartelt, Durham, NC (US); Constantine Peros, Honolulu, HI (US); Mauricio Espin, Getxo (ES); Brad Martin, St. Louis, MO (US)

(73) Assignee: AlignAI, LLC, Clayton, MO (US)

( * ) Notice: Subject to any disclaimer, the term of this patent is extended or adjusted under 35 U.S.C. 154(b) by 395 days.

(21) Appl. No.: 18/367,864

(22) Filed: Sep. 13, 2023

(65) Prior Publication Data

US 2024/0082679 A1 Mar. 14, 2024

Related U.S. Application Data

(60) Provisional application No. 63/406,311, filed on Sep. 14, 2022.

(51) Int. Cl.
*A63B 24/00* (2006.01)
*A63B 69/36* (2006.01)
(Continued)

(52) U.S. Cl.
CPC ...... *A63B 24/0003* (2013.01); *A63B 69/3629* (2020.08); *A63B 71/0622* (2013.01);
(Continued)

(58) Field of Classification Search
CPC . A63B 24/0003; A63B 24/0021; A63B 69/36; A63B 69/3629; A63B 69/3667;
(Continued)

(56) References Cited

U.S. PATENT DOCUMENTS

| | | | | |
|---|---|---|---|---|
| 5,042,815 A * | 8/1991 | Sutton | ................ | A63B 69/3667 473/218 |
| 5,707,301 A * | 1/1998 | Tollin | ................ | A63B 69/3667 473/252 |

(Continued)

FOREIGN PATENT DOCUMENTS

| | | |
|---|---|---|
| DE | 102021108390 A1 | 10/2022 |
| KR | 102436279 B1 | 8/2022 |
| WO | 2021150127 A9 | 11/2021 |

OTHER PUBLICATIONS

Office Action for U.S. Appl. No. 18/367,873 dated Dec. 4, 2024.

(Continued)

*Primary Examiner* — Steve Rowland
(74) *Attorney, Agent, or Firm* — Thompson Coburn LLP

(57) ABSTRACT

Techniques are disclosed where computer technology is practically applied to solve the technical problem of helping golfers align their golf shots with respect to their targets. This technology can operate in coordination with an alignment device (e.g., an alignment stick) used by the golfer as an aid for aligning the golf shot with the target. In an example, the disclosed system can use image processing in combination with computer-based modeling of physical relationships with respect to an alignment device, ball, and/or target that exist in the real world to compute and adjust alignments for golf shots. This technology can provide real-time feedback to golfers for improved training and shot accuracy.

41 Claims, 17 Drawing Sheets

(51) Int. Cl.
*A63B 71/06* (2006.01)
*G06T 7/73* (2017.01)

(52) U.S. Cl.
CPC ........ *G06T 7/73* (2017.01); *A63B 2024/0031* (2013.01); *A63B 69/3667* (2013.01); *A63B 2071/0694* (2013.01); *A63B 2214/00* (2020.08); *A63B 2220/05* (2013.01); *A63B 2220/807* (2013.01); *A63B 2225/74* (2020.08); *G06T 2207/20081* (2013.01); *G06T 2207/30224* (2013.01)

(58) Field of Classification Search
CPC ............. G06T 7/73; G06T 2207/20081; G06T 2207/30224
See application file for complete search history.

(56) References Cited

U.S. PATENT DOCUMENTS

| | | | | |
|---|---|---|---|---|
| 6,050,902 | A | 4/2000 | McCrink Jr. | |
| 9,393,477 | B2 | 7/2016 | Landsman et al. | |
| 9,393,478 | B2 * | 7/2016 | Niegowski | A63B 71/0669 |
| 9,661,894 | B2 * | 5/2017 | Niegowski | A63B 37/0003 |
| 9,737,757 | B1 | 8/2017 | Kiraly | |
| 9,925,450 | B2 * | 3/2018 | Landsman | A63B 71/146 |
| 10,113,689 | B2 | 10/2018 | Oh | |
| 10,232,225 | B1 * | 3/2019 | Oberc | A63B 69/3655 |
| 10,603,567 | B2 | 3/2020 | Springub | |
| 2007/0263089 | A1 * | 11/2007 | Hess | A63B 24/0003 348/148 |
| 2009/0017944 | A1 * | 1/2009 | Savarese | G01S 13/56 473/409 |
| 2009/0111602 | A1 * | 4/2009 | Savarese | G01S 19/19 473/283 |
| 2010/0099509 | A1 * | 4/2010 | Ahem | A63B 71/0669 700/92 |
| 2011/0065530 | A1 * | 3/2011 | Molinari | A63B 69/3688 473/378 |
| 2011/0230273 | A1 | 9/2011 | Niegowski et al. | |
| 2011/0230274 | A1 * | 9/2011 | Lafortune | A63B 71/0669 473/217 |
| 2011/0230985 | A1 * | 9/2011 | Niegowski | A63B 24/0003 700/91 |
| 2011/0237343 | A1 | 9/2011 | Bowman et al. | |
| 2012/0052971 | A1 * | 3/2012 | Bentley | A63B 24/0006 473/222 |
| 2012/0088544 | A1 * | 4/2012 | Bentley | A63F 13/332 455/556.1 |
| 2012/0194516 | A1 | 8/2012 | Newcombe et al. | |
| 2012/0309554 | A1 * | 12/2012 | Gibbs | A63B 69/3621 473/409 |
| 2013/0178311 | A1 | 7/2013 | Peterson | |
| 2014/0113738 | A1 | 4/2014 | Shore | |
| 2014/0347193 | A1 * | 11/2014 | Ljung | H04L 67/04 340/870.01 |
| 2015/0157944 | A1 * | 6/2015 | Gottlieb | A63F 13/812 463/4 |
| 2015/0318015 | A1 * | 11/2015 | Bose | G08B 21/043 386/248 |
| 2016/0317896 | A1 * | 11/2016 | Albelo | G01S 19/19 |
| 2017/0368438 | A1 | 12/2017 | Landsman et al. | |
| 2018/0050254 | A1 * | 2/2018 | Maani | G06V 40/23 |
| 2018/0053308 | A1 * | 2/2018 | Maani | G06T 7/251 |
| 2018/0133578 | A1 * | 5/2018 | Kiraly | G06T 7/73 |
| 2018/0140898 | A1 * | 5/2018 | Kasha | A63B 71/0622 |
| 2018/0214759 | A1 * | 8/2018 | Springub | A61B 5/1112 |
| 2019/0255415 | A1 * | 8/2019 | Helmker | A63B 69/3621 |
| 2019/0299058 | A1 * | 10/2019 | Chan | H04N 23/60 |
| 2020/0282283 | A1 * | 9/2020 | Xu | A63B 60/46 |
| 2020/0306611 | A1 * | 10/2020 | Russo | A63B 69/3667 |
| 2020/0346094 | A1 | 11/2020 | Jackson et al. | |
| 2021/0069548 | A1 * | 3/2021 | Beach | A63B 24/0006 |
| 2021/0170252 | A1 | 6/2021 | Hants | |
| 2022/0008800 | A1 | 1/2022 | Weissinger et al. | |
| 2022/0212081 | A1 * | 7/2022 | Kubodera | G06V 40/23 |
| 2022/0219044 | A1 | 7/2022 | Beach et al. | |
| 2022/0331679 | A1 | 10/2022 | Wolf | |
| 2023/0032076 | A1 * | 2/2023 | Lee | G06V 40/23 |
| 2023/0072561 | A1 * | 3/2023 | Yoon | A63B 69/3608 |

OTHER PUBLICATIONS

Office Action for U.S. Appl. No. 18/367,873 dated Aug. 12, 2025.
USPTO Prosecution History for U.S. Appl. No. 18/367,873, filed Sep. 13, 2023, downloaded Apr. 21, 2026.

* cited by examiner

IMAGE-BASED SPATIAL MODELING OF ALIGNMENT DEVICES TO AID GOLFERS FOR GOLF SHOT ALIGNMENTS

CROSS-REFERENCE AND PRIORITY CLAIM TO RELATED PATENT APPLICATION

This patent application claims priority to U.S. provisional patent application 63/406,311, filed Sep. 14, 2022, and entitled "Applied Computer Technology for Golf Shot Alignment", the entire disclosure of which is incorporated herein by reference.

This patent application is also related to U.S. patent application Ser. No. 18/367,873, filed this same day, and entitled "Applied Computer Technology for Golf Shot Alignment", the entire disclosure of which is incorporated herein by reference.

INTRODUCTION

There is a problem in the art that arises from golfers who manually position an alignment device on the ground in an effort to align their positioning relative to the ball and the target because such manually positioned alignment devices are often in fact misaligned relative to the target. For example, FIG. 1 shows a scenario where a golfer has placed an alignment stick (see 226) in front of his feet. In this example, the golfer is unaware that the alignment stick is misaligned relative to the target. It should be appreciated that even small misalignments that are imperceptible to the naked eye can yield relatively large distances between the actual shot target and the desired shot target when considering the range to the desired shot target (e.g., a relatively small misalignment of the alignment stick by 3.2 degrees would yield a misalignment error of approximately 30 feet at 180 yards). Proper alignment is a critical element to good golf, and the use of an alignment device is critical to good/effective practice. With misalignment, golfers spend hours practicing while thinking that they are hitting the ball offline; when in reality, they have materially misaligned their alignment device.

Practicing while misaligned is counterproductive, promotes harmful compensations, and contributes to the development of bad habits.

However, achieving proper alignment of a golf shot is technically challenging. For example, previous attempts at helping golfers with evaluating the alignment of their shots suffer from shortcomings.

For example, U.S. Pat. No. 9,737,757 (Kiraly) discloses a golf ball launch monitor that can use one or more cameras to generate images of a golf shot and process those images to determine the shot's trajectory. Kiraly describes that this image processing can include detecting the presence of alignment sticks in the images, where the detected alignment stick would establish the frame of reference for determining whether the shot's trajectory was on target or off target. However, Kiraly suffers from an assumption that the alignment stick is properly aligned with the golfer's target. In other words, Kiraly merely informs users how well the trajectories of their shots align with the directional heading of the alignment stick. Kiraly fails to provide any feedback regarding whether the alignment stick is itself aligned with the target. In many cases, the alignment stick placed by the golfer will not be aligned with the target, in which case Kiraly's feedback about alignment would be based on a faulty premise.

U.S. Pat. No. 10,603,567 (Springub) discloses various techniques for aligning a golfer with a target, where these techniques rely on the use of active sensors that are disposed in, at, or near the golfer's body or clothing to determine where the golfer's body is pointing. In an example embodiment, Springub discloses the use of an active sensor that is included as part of a ruler on the ground and aligned with the golfer's feet. The active sensors serve as contact sensors that permit the golfer to position his or her feet in a desired orientation. However, this approach also suffers from an inability to gauge whether the ruler is actually aligned with the golfer's target.

In an effort to address these technical shortcomings in the art, disclosed herein are techniques where computer technology is practically applied to solve the technical problem of aligning a golf shot for a golfer with a target. This technology can operate in coordination with an alignment device (e.g., an alignment stick) used by the golfer as an aid for aligning the golf shot with the target.

To solve this technical problem, the inventor discloses examples that use image processing in combination with computer-based modeling of physical relationships as between an alignment device, ball, and/or target that exist in the real world to compute and adjust alignments for golf shots. This inventive technology can provide real-time feedback to golfers for improved training and shot accuracy.

According to an example embodiment, image data about a scene can be processed. This image data comprises one or more images of the scene, wherein the one or more images comprise a plurality of pixels, the pixels having pixel coordinates in the one or more images, wherein the image data includes depictions of an alignment device and a target in the scene. One or more processors translate a plurality of the pixel coordinates applicable to the alignment device to 3D coordinates in a frame of reference based on a spatial model of the scene. The one or more processors also determine an orientation of the alignment device relative to the frame of reference based on the translation of the pixel coordinates. The one or more processors can generate alignment data based on the determined alignment device orientation, wherein the generated alignment data is indicative of a relative alignment for the alignment device in the scene with respect to a golf shot for striking a golf ball toward the target. Feedback that is indicative of the generated alignment data can then be generated for presentation to a user.

As an example, the generated alignment data can be a target line from the golf ball that has the same orientation as the alignment device. With this example, the feedback can be visual feedback that depicts the target line in the scene. Moreover, the generated alignment data may also include an identification and/or quantification of any discrepancy that exists between the target line and the target. Further still, the feedback can include a presentation of any identified and/or quantified discrepancy between the target line and the target.

As another example, the generated alignment data can be a projection of an alignment line that extends outward into the scene toward the target from the alignment device, where the alignment line has the same orientation as the alignment device. With this example, the feedback can be visual feedback that depicts the alignment line in the scene, which can allow the user to visually evaluate how close the alignment line is to the target. Moreover, the generated alignment data may also include an identification and/or quantification of any discrepancy that exists between the alignment line and the target. Further still, the feedback can include a presentation of any identified and/or quantified discrepancy between the alignment line and the target.

As still another example, the generated alignment data can be a projection of a line that extends from the target toward the golfer, where this line has the same orientation as the alignment device. Such a line projection can help support a decision by the golfer regarding where the ball can be placed in the scene (from which the golfer would strike the ball). With this example, the feedback can be visual feedback that depicts this line in the scene or a depiction of a suggested area for ball placement in the scene (where the suggested ball placement area is derived from the projected line (e.g., a point, line, circle, or other zone/shape around the projected line near the alignment device where the golfer is expected to be standing)).

According to another example embodiment, image data about a scene can be processed, where this image data comprises one or more images of the scene, wherein the one or more images comprise a plurality of pixels, the pixels having pixel coordinates in the one or more images, wherein the image data includes depictions of a golf ball and a target in the scene. One or more processors translate a plurality of the pixel coordinates applicable to the golf ball and the target to 3D coordinates in a frame of reference based on a spatial model of the scene. The one or more processors also determine a line relative to the frame of reference, wherein the determined line connects the 3D coordinates for the golf ball with the 3D coordinates for the target. Feedback that is indicative of the determined line can then be generated for presentation to the user.

These and other example embodiments are described in greater detail below.

DETAILED DESCRIPTION OF EXAMPLE EMBODIMENTS

Figure 1:
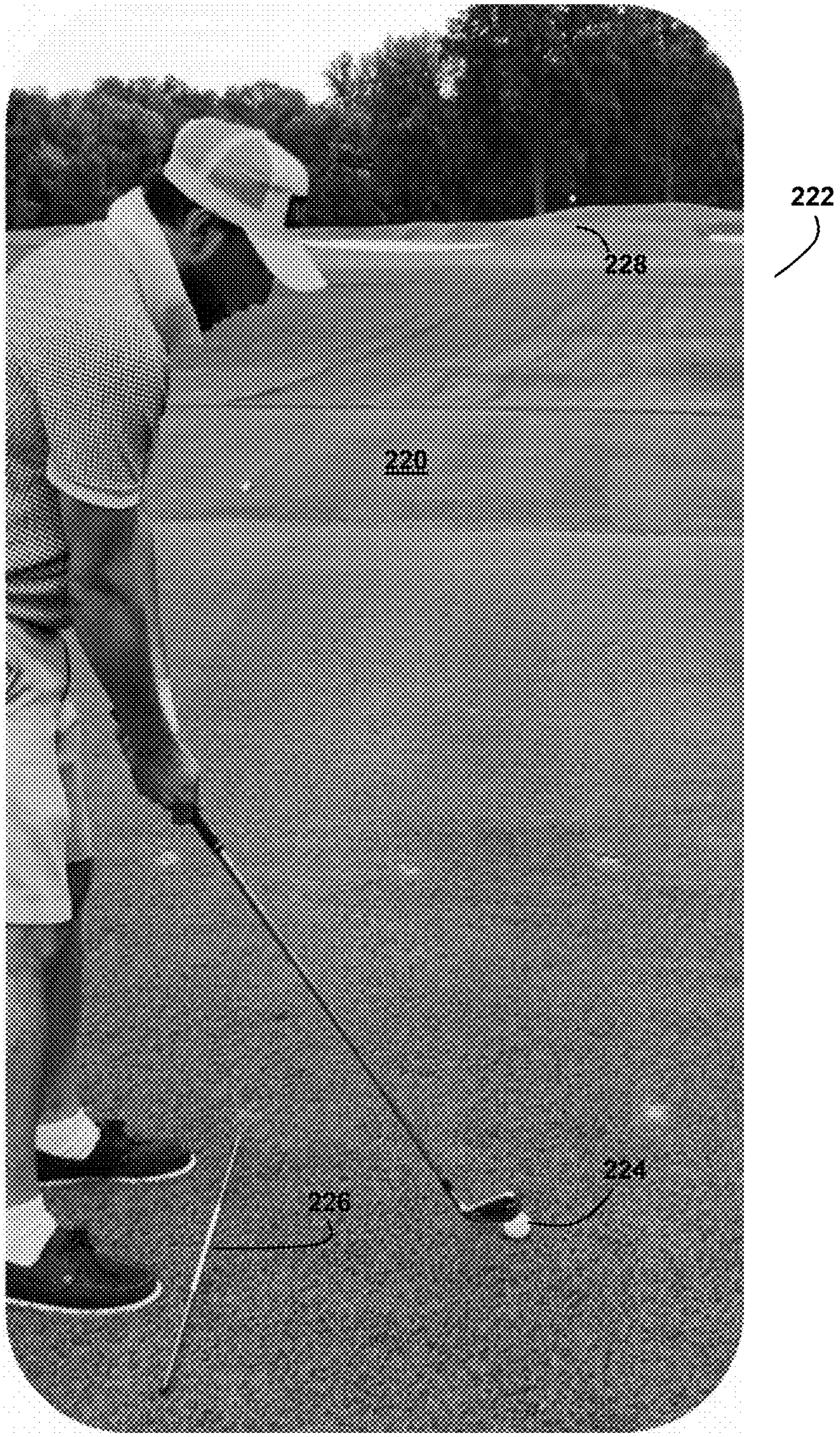
FIG. 1 depicts an example image of a scene which includes a golfer using an alignment stick to help align his shot to a target.
Figure 2:
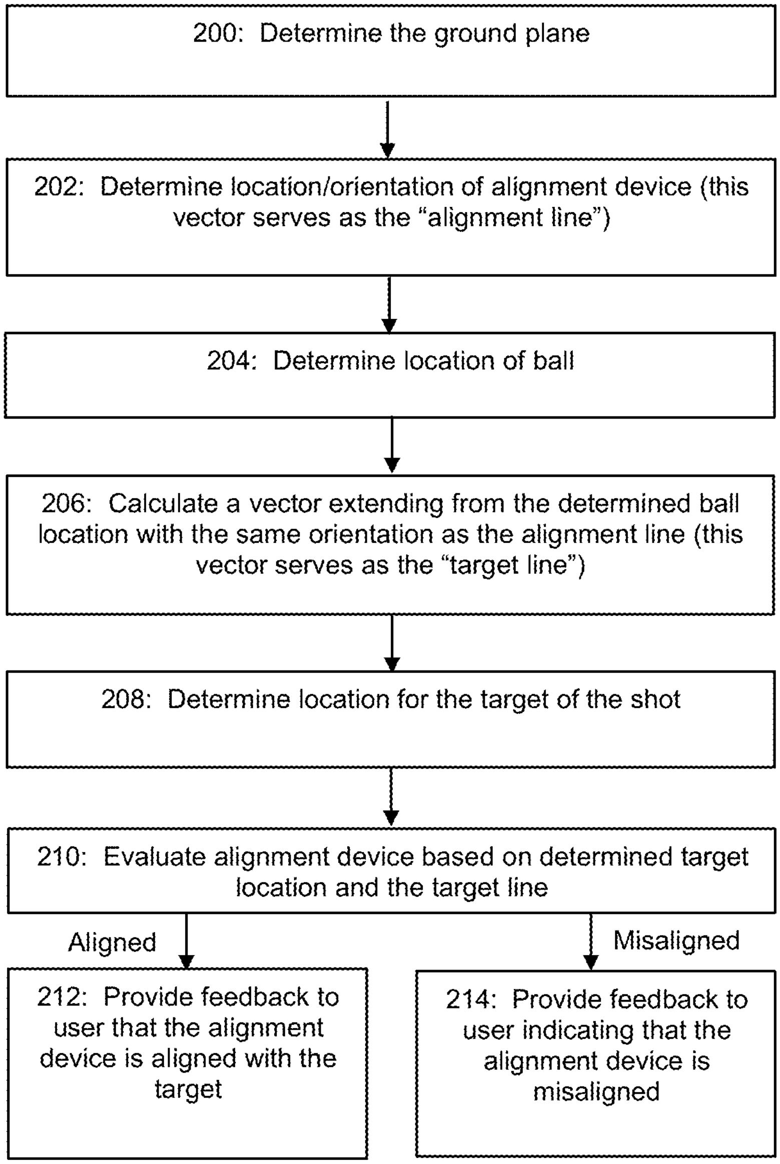
FIG. 2 depicts an example process flow for evaluating whether an alignment device is aligned with a target for a golfer.

FIG. 2 shows an example process flow for image-based determinations regarding whether an alignment device is aligned with a target for a golfer. The process flow of FIG. 2 can be performed by one or more processors that operate on one or more images of a scene, where these one or more images include depictions of a scene such as the scene 220 depicted by FIG. 1. The image(s) can be generated by one or more optical sensors such as one or more cameras. The image(s) can take the form of still images (e.g., photographs) and/or moving images (e.g., video). Further still, the image(s) may comprise 2D image(s) such as those generated by cameras and/or 3D image(s) such those generated by lidar or lidar-equipped cameras.

FIG. 1 shows an example image 222 that depicts scene 220, where the scene 220 is a 3D space that would encompass a field of view for a golfer, typically from a perspective that encompasses (1) a golf ball 224 that the golfer intends to strike, (2) an alignment device 226 that is placed on the ground by the golfer as a guide for how to position his or her feet and/or body, and (3) a target 228 toward which the golfer intends to aim his or her shot. The image 222 can be a 2D image of the 3D space, where the 2D image comprises a plurality of pixels that have corresponding locations in the 3D space. Typically, it is expected that the ball 224 and alignment device 226 will be depicted in the foreground of the scene 220, while the target 228 will be depicted in the background of the scene 220. However, it should be understood that a single image 222 need not encompass the full scene. For example, multiple images may be used, where each individual image only encompasses a portion of the scene 220 while the multiple images (in the aggregate) encompass the full scene 220. Moreover, it should be understood that the scene 220 need not necessarily include the ball 224, alignment device 226, and target 228. For example, examples are discussed below where the ball 224, alignment device 226, or target 228 may be omitted from the processing operations in which case they need not necessarily be present in the scene 220 depicted by the image(s) 222. Further still, it should be also be understood that the scene 220 may depict additional objects—namely, anything that would be in the field of view of a camera when the image 222 is generated (e.g., golf mats, golf tees, trees, etc.).

In an example embodiment, the image 222 can be captured by a camera. For example, the camera can capture the image 222 when the camera is oriented approximately 90 degrees/perpendicular to the target line (as described below) which can facilitate processing operations with respect to changes in elevation between the ball 224 and the target 228. However, it should be understood that the camera need not be oriented in this manner for other example embodiments. For example, the camera could be positioned obliquely relative to the target line and still be capable of generating and evaluating shot alignments. Moreover, the image capture can be accomplished manually based on user operation of the camera (e.g., via user interactions with the user interface of a camera app on a smart phone) or automatically and transparently to the user when running the system (e.g., a sensor such as a camera automatically begins sensing the scene when the user starts a mobile app). Images such as the one shown by image 222 can serve as a data basis for evaluating whether the alignment device 226 is positioned in a manner that will align the golfer with the target when swinging and hitting the ball. Furthermore, it should be understood that with example embodiments, this data may be further augmented with additional information such as a range to the target, which may be inputted manually or derived by range finding equipment, GPS or other mapping data, and/or lidar (which may potentially be equipment that is resident on a smart phone).

To support the generation of alignment data about the alignment device, the pixel coordinates of one or more objects in the image data (e.g., the ball 224, alignment device 226, and/or target 228) are translated to 3D coordinates in a frame of reference based on a spatial model of the scene 220. This spatial model can define a geometry for the scene 220 that positionally relates the objects depicted in the scene 220. Augmented reality (AR) processing technology such as Simultaneous Localization and Mapping (SLAM) techniques can be used to establish and track the coordinates in 3D space of the objects depicted in the image data. Moreover, as discussed below, the system can track movement and tilting of the camera that generates the image data so that the 3D coordinate space of the scene can be translated from the pixel coordinates of the image data as images are generated while the camera is moving.

The AR processing can initialize its spatial modeling by capturing image frames from the camera. While image frames are being captured, the AR processing can also obtain data from one or more inertial sensors associated with the camera (e.g., in examples where the camera is part of a mobile device such as a smart phone, the mobile device will have one or more accelerometers and/or gyroscopes that serve as inertial sensors), where the obtained data serves as inertial data that indicates tilting and other movements by the camera. The AR processing can then perform feature point extraction. The feature point extraction can identify feature points (keypoints) in each image frame, where these feature points are points that are likely to correspond to the same physical location when viewed from different angles by the camera. A descriptor can be computed for each feature point, where the descriptor summarizes the local image region around the feature point so that it can be recognized in other image frames.

The AR processing can also perform tracking and mapping functions. For local mapping, the AR system can maintain a local 3D map of the scene, where this map comprises the feature points and their descriptors. The AR system can also provide pose estimation by mapping feature points between image frames, which allows the system to estimate the camera's pose (its position and orientation) in real-time. The AR system can also provide sensor fusion where inertial data from the inertial sensors are fused with the feature points to improve tracking accuracy and reduce drift.

As an example, the AR processing can be provided by software such as Android's ARCore and/or Apple's ARKit libraries.

The alignment device 226 can take any of a number of forms, e.g., an alignment stick, a golf club, a range divider, wood stake, the edge of a hitting mat, or other directional instrument. In some embodiments, the alignment device 226 may even take the form of projected light. In still other embodiments, the alignment device 226 may take the form of a line on the ball 224 (e.g., see FIG. 9 discussed below). Typically, the alignment device 226 is positioned on the ground near the ball 224 and/or golfer. For example, the alignment device 226 can be positioned just in front of or behind where the golfer's feet would be positioned when he or she lines up for the shot. As additional examples, the alignment device 226 can be positioned somewhere between the golfer and the ball 224, somewhere on the opposite side of the ball 224 from the golfer, or somewhere in front of or behind the ball 224 relative to the target 228.

The target 228 can be any target that the golfer wants to use for the shot. For example, the target 228 can be a flagstick, hole, or any other landmark that the golfer may be using as the target for the shot.

The FIG. 2 process flow can process the image(s) 222 to determine whether alignment device 226 as depicted in the image(s) 222 is aligned with the target 228 as depicted in the image(s) and provide feedback to the user indicative of this alignment determination. The user can be a golfer who is planning to hit a shot of the golf ball 224 toward target 228.

At step 200, the processor processes the image data to determine the ground plane depicted by the image data. The processor can read the image data from memory that holds image data generated by a camera. The ground plane is the plane on which the alignment device 226 is positioned. This ground plane determination establishes a frame of reference for determining the orientation of the alignment device 226, the position of the ball 224, and the position of the target 228 in 3D space.

Figure 4A:
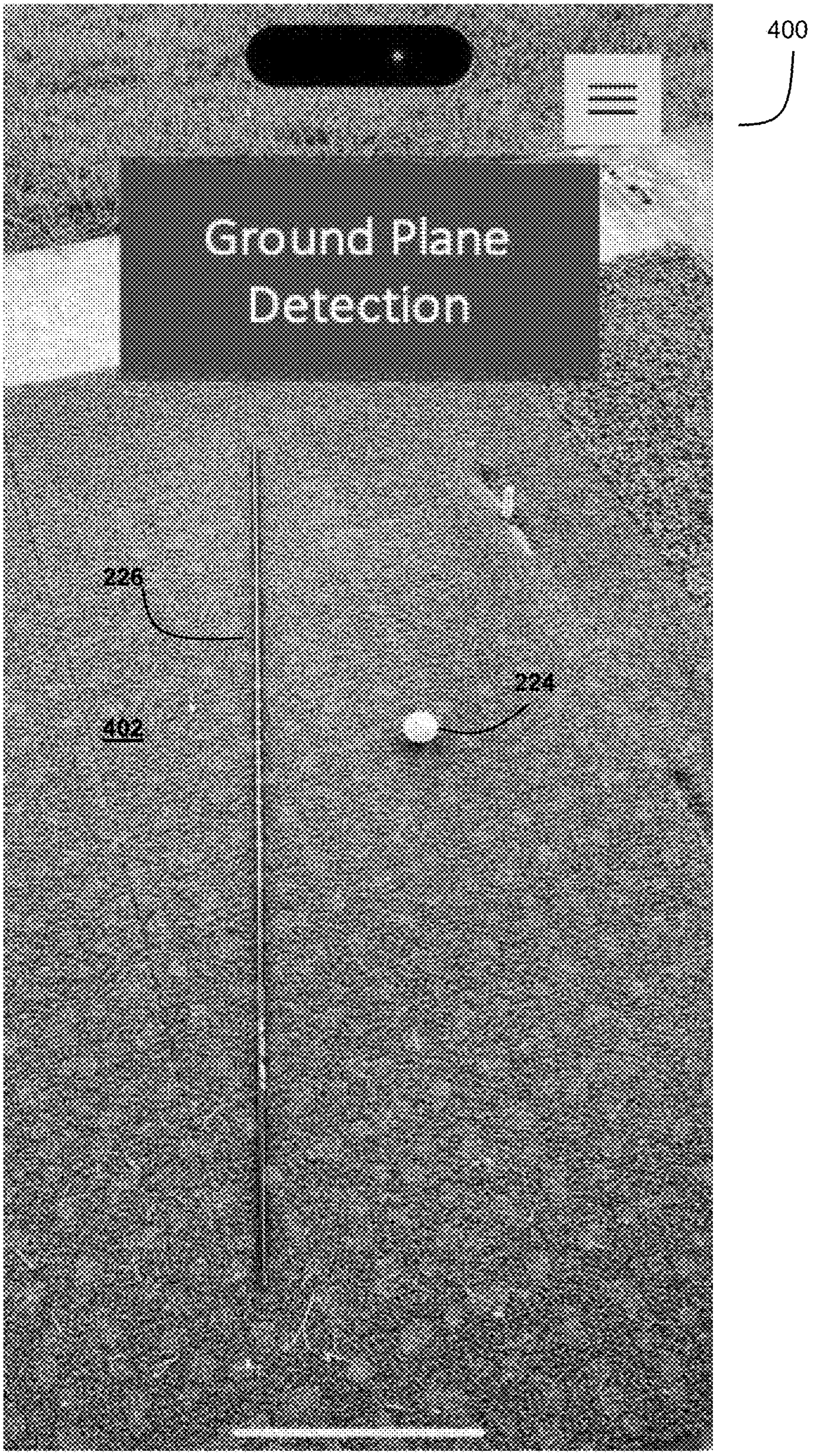
FIGS. 4A, 4B, 4C, 4D, 4E, 4F, and 4G depict example images that can be presented to users via mobile devices to support the alignment evaluation techniques described herein.

FIG. 4A shows an example image 400 that can be processed at step 200 to determine the ground plane 402. In this example, image 400 encompasses the ball 224 and alignment device 226 that have been placed on the ground. The ground plane 402 can be detected in the image data as a virtual plane that provides a frame of reference for the 3D space of the environment depicted by the image data.

AR processing technology such as SLAM techniques can be used to establish this ground plane 402 and track the spatial relationship between the camera that generates the image data and the objects depicted in the image data. For example, the AR processing can work on a point cloud of feature points in a 3D map that are derived from the image data to identify potential planes. The Random Sample Consensus (RANSAC) algorithm or similar techniques can be used to fit planes to subsets of the point cloud. Candidate ground planes are then validated and refined over several image frames to ensure that they are stable and reliable. The ground plane 402 can be represented in the data by a pose, dimensions, and boundary points. The boundary points can be convex, and the pose defines a position and orientation of the plane. The pose can be represented by a 3D coordinate and a quaternion for rotation. This effectively defines the origin of the plane in the 3D spatial model and defines how it is rotated. The pose of the plane can be characterized as where the plane is and how it is oriented in the coordinate system of the 3D spatial model for the scene 220. The defined origin can serve as a central point from which other properties of the ground plane 402 are derived. The dimensions of the ground plane 402 refer to the extent of the ground plane 402, which can usually be described by a width and a length. This can be exposed by the AR system as extents, providing a half-extent in each of the X and Z dimensions (since the ground plane 402 is flat, there would not be a Y extent). Knowing the extents allows the system to understand how big the ground plane 402 is and consequently how much space there is for placing virtual objects in a scene. The boundary points describe the shape of the ground plane 402 along its edges. The ground plane 402 may not be a perfect rectangle and it may have an irregular shape. For example, the ground plane 402 can be defined to have a convex shape if desired by a practitioner (in which case all interior angles of the ground plane 402 would be less than or equal to 180 degrees and the line segment connecting any two points inside the convex shape would also be entirely inside the convex shape. Understanding a set of boundary points for the ground plane 402 allows the AR system to render a visual graphic of the ground plane 402 in a displayed image and help detect collisions/intersections with virtual objects in the scene. Accordingly, it should be understood that a practitioner may choose to visually highlight the detected ground plane 402 in a displayed image which can help with the placement of virtual objects on the ground plane 402.

At step 202, the processor processes the image data to determine the location and orientation of the alignment device 226. This location and orientation can be a vector that defines the directionality of the alignment device 226 with respect to the alignment device's dominant direction (e.g., its length) in 3D space relative to the ground plane. This vector can be referred to as the "alignment line" or "extended alignment line", which can be deemed to extend outward in space from the foreground of the scene 220 to the background of the scene 220 in the general direction of the target 228.

Figure 4B:
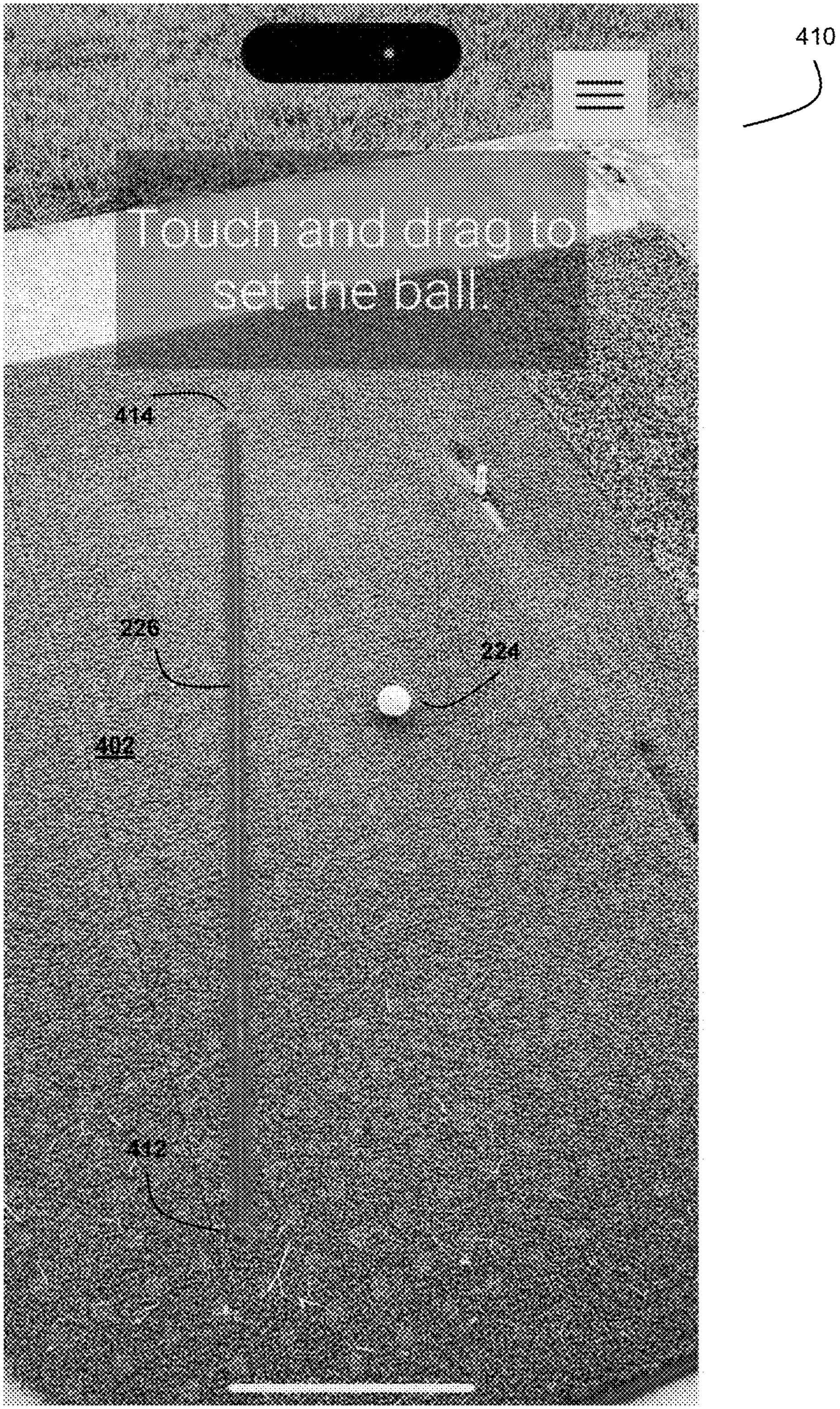

In an example embodiment, the alignment device 226 can be identified in the image data in response to user input such as input from a user that identifies two points on the alignment device 226 as depicted in the image data. An example of this is shown by FIG. 4B, which depicts an image 410 that can be presented on a mobile device such as a smart phone with a touchscreen display. Via the touchscreen display, the user can select two points 412 and 414 that lie on the alignment device 226 as depicted in the image 410. Points 412 and/or 414 can be positioned on the touchscreen display in response to user placing his or her finger on the touchscreen display and then dragging his or her finger to the desired point on the alignment device 226. However, it should be understood that a practitioner may choose to receive the user input without employing drop and drag techniques (such as a simple touch input to define a point location). The displayed image 410 may also draw a colored line that connects the two points 412 and 414 to indicate to the user that the alignment device 226 has been detected in response to the user input.

The pixel locations of points 412 and 414 can be translated into locations in the 3D space referenced by the ground plane 402. To find these 3D points, rays can be cast from the position of the camera outwards at point 412 and at point 414. If the rays collide with the detected ground plane 402, the AR system can get these collision points, which are 3D positions that can be represented by x, y, and z float variables. For the ray cast, the ray can start at a specified origin point in the 3D space of the system's spatial model (e.g., the camera). The ray can be cast from this origin point in a direction away from the camera through the pixel location on the display screen that has been selected by the user (e.g., point 412 or point 414). Optionally, a distance for the ray can be specified, although this need not be the case. The intersection of the ray with the ground plane 402 would then define the 3D coordinates for the specified point (412 or 414 as applicable). For example, SLAM technology as discussed above can provide this translation. Accordingly, the line that connects points 412 and 414 in the 3D space defines the orientation of the alignment device 226, and this orientation can define a vector that effectively represents where the alignment device 226 is aimed. As such, the vector defined by the orientation of the alignment device 226 can be referred to as the alignment line for the alignment device 226. The alignment line vector can be deemed to lie in the ground plane 402, and the alignment line vector can be defined by 3D coordinates for two points along the alignment line. Based on the 3D coordinates for these two points, the alignment line will exhibit a known slope (which can be expressed as an azimuth angle and elevation angle between the two points 412 and 414). Vector subtraction can be used to determine the directional heading (orientation) of the alignment device 224, and a practitioner may choose to virtually render the alignment line (or at least the portion of the alignment line connecting points 412 and 414) in the displayed image.

While the example of FIG. 4B shows the two points 412 and 414 being located at opposite endpoints of the alignment device 226, it should be understood that this need not be the case. The user could select any two points on the alignment device 226 as points 412 and 414 if desired.

While the example discussed above employs user input to identify the alignment device 226 in the image data, it should also be understood that automated techniques for detecting the alignment device 226 can be used if desired by a practitioner. For example, the processor can use computer vision techniques such as edge detection, corner detection, and/or object recognition techniques to automatically detect the existence and location of an alignment device 226 in the image data. For example, the image data can be processed to detect areas of high contrast with straight lines to facilitate automated detection of an alignment stick. The object recognition can be based on machine learning (ML) techniques where a classifier is trained using known images of alignment devices to detect the presence of an alignment device in an image. An example of ML techniques that can be used in this regard include YOLOX and convolutional neural networks (CNNs) that are trained to recognize alignment devices. To facilitate such automated detection, the alignment device 226 can include optically-readable indicia such as predefined patterns, labels, or the like that allow it to be easily detected within the image data. However, it should be understood that these optically-readable indicia need not necessarily be used because computer vision techniques can also be designed to recognize and detect alignment devices that have not been marked with such optically-readable indicia. Further still, the system can employ detection techniques other than optical techniques for locating the alignment device 226. For example, the alignment device can include wireless RF beacons utilizing RFID or Bluetooth technology to render the alignment device 226 electromagnetically detectable, and triangulation techniques could be used to precisely detect the location and orientation of the alignment device 226.

At step 204, the processor processes the image data to determine the location of the ball 224. This location can be referenced to the ground plane 204 so that the position of the ball 224 in 3D space relative to the alignment line is known.

Figure 4C:
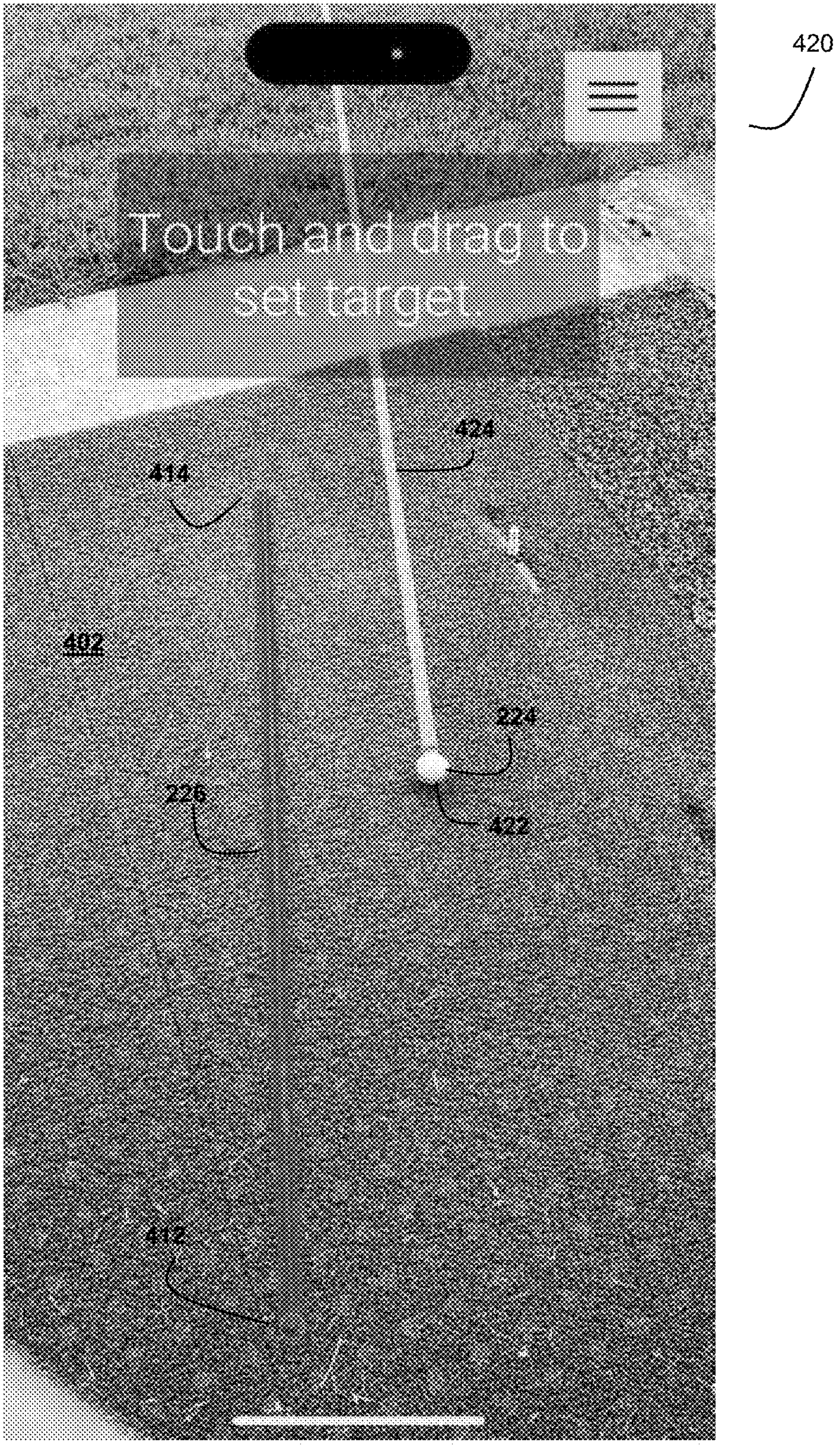

In an example embodiment, the ball 224 can be identified in the image data in response to user input such as input from a user that identifies a point where the ball 224 is located in the image. An example of this is shown by FIG. 4C, which depicts an image 420 that can be presented on a mobile device such as a smart phone with a touchscreen display. Via the touchscreen display, the user can select point 422 that lies on the ball 224 as depicted in the image 420. Point 422 can be positioned on the touchscreen display in response to user placing his or her finger on the touchscreen display and then dragging his or her finger to the desired point on the ball 224. However, it should be understood that a practitioner may choose to receive the user input without employing drop and drag techniques (such as a simple touch input to define a point location). The displayed image 420 may also draw a colored circle that indicates to the user the location of ball 224 that has been defined by the user input point 422. The pixel location of point 422 can be translated into a location in the 3D space referenced by the ground plane 402 such as a coordinate that lies on the ground plane. This translation can be accomplished using the techniques discussed above for translating points 412 and 414 to the 3D space that is referenced by the ground plane 402. That is, point 422 can be represented by x,y,z float coordinates which are determined by getting the collision point on the ground plane 402 for the ray that is cast outwards from the camera when the point 422 is defined. For example, SLAM techniques can be used to make this translation; and a practitioner may choose to visually render a golf ball-sized visual at point 422 in the displayed image.

While the example discussed above employs user input to identify the ball 224 in the image data, it should also be understood that automated techniques for detecting the ball 224 can be used if desired by a practitioner. For example, the processor can use edge detection, corner detection, and/or object recognition techniques to automatically detect the existence and location of a golf ball in the image data. The object recognition can be based on machine learning (ML) techniques where a classifier is trained using known images of golf balls to detect the presence of a golf ball in an image. An example of ML techniques that can be used in this regard include convolutional neural networks (CNNs) that are trained to recognize golf balls.

At step 206, the processor calculates a vector extending from the determined ball location, where this calculated vector has the same orientation as the alignment line. This calculated vector serves as the "target line" for the shot. Accordingly, it should be understood that the target line has the same directional heading as the alignment line.

To calculate the target line, the system can use the 3D coordinate for the location of ball 224 (defined via point 422) as the origin for the target line vector and extend the target line vector outward with the same directional heading as the alignment line. For purposes of a visual display of the target line, the system may also optionally specify a distance for how long the target line is to extend from the ball location 422 along the directional heading with the same orientation as the alignment line.

Figure 4D:

FIG. 4C shows a visual depiction of the target line 424 in image 420. The alignment line will be parallel with the target line; and it should be understood that target line 424 represents the targeting of the ball 224 that is defined by the alignment device 226. FIG. 4D shows an image 430 that is zoomed out from the image 420 of FIG. 4C, where image 430 includes an overlay of the target line 424 extended outward into the field of view. This overlay can be added to the image 420 using AR techniques. As used in this context, it should be understood that the term AR also encompasses MR or other modalities where virtual graphics are overlaid on images of real-world scenery. Due to the 3D perspective of image 430 and vanishing point principles, the parallel alignment and target lines appear in image 430 as two lines that converge at a horizon line in the distance.

At step 208, the processor processes the image data to determine the location of the target 228. This location can be referenced to the ground plane 204 so that the position of the target 228 in 3D space relative to the alignment line and the target line 424 is known.

Figure 4E:
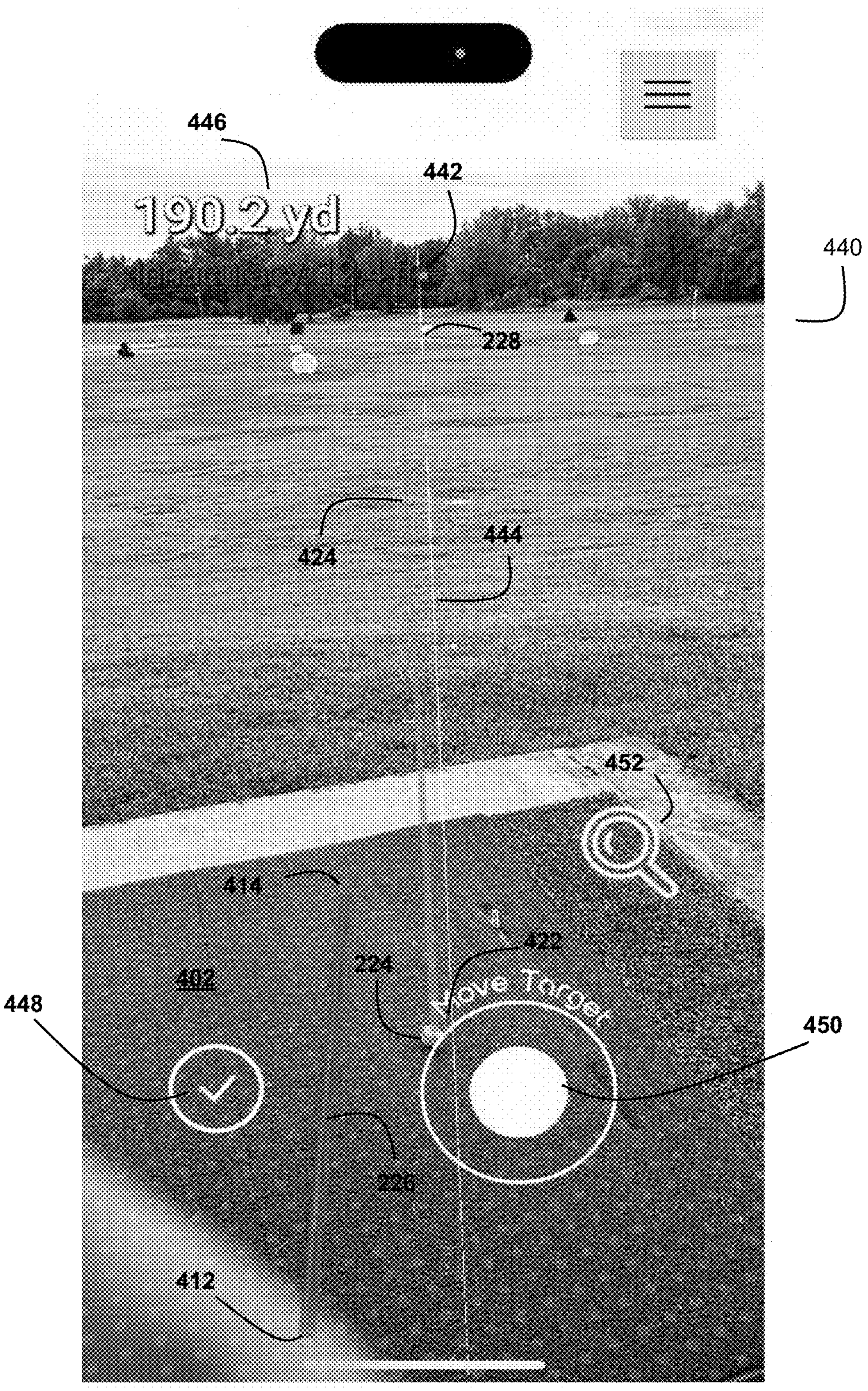

In an example embodiment, the target 228 can be identified in the image data in response to user input such as input from a user that identifies a point where the target 228 is located in the image. An example of this is shown by FIG. 4E, which depicts an image 440 that can be presented on a mobile device such as a smart phone with a touchscreen display. Via the touchscreen display, the user can select point 442 that defines the target 228 in the image 420. In this example, point 442 can be visually depicted in the image 440 as a virtual flag. However, it should be understood that other graphical representations of point 442 can be overlaid on image 440 if desired by a practitioner. Point 442 can be positioned on the touchscreen display in response to user placing his or her finger on the touchscreen display and then dragging his or her finger to the desired point that serves as the target 228. However, it should be understood that a practitioner may choose to receive the user input without employing drop and drag techniques (such as a simple touch input to define a point location). The pixel location of point 442 can be translated into a location in the 3D space referenced by the ground plane 402 using the techniques discussed above for steps 202 and 204. This translation can be accomplished using SLAM techniques. For example, the point 442 can be placed tangential to the virtual plane that is extrapolated from the target line vector 424 so that the target 228 is deemed to exist at the same height as the ball's presumed straight line trajectory at any given distance from the ball 224.

The displayed image 440 may also draw a line 444, where line 444 is a vertical line from point 442 (representing target 228) that is perpendicular with the ground plane 402. Line 444 can help the user with respect to visualizing the placement of point 442 for the target 228. Moreover, because line 444 connects to point 442 and is perpendicular to the ground plane 402, it should be understood that the display of line 444 in the displayed image may tilt as the user tilts the camera, which allows the user to visually gauge his or her perspective through the camera relative to the target 228. However, it should be understood that a practitioner may choose to implement step 208 without displaying the line 444 if desired.

Moreover, the system may optionally also leverage topographical map data, lidar data, or other data that would provide geo-located height (elevation) data for the land covered by the scene 220 in the image data. This height data can be leveraged by the system to take the contours of the land in scene 220 into consideration when the user is dragging a point 442 (e.g., a virtual flag) out toward the desired target 228 on the display image so that the point 442 can move up and down the contours of the scene 220 to thereby inform the user of the contours in the field. Similarly, this height data can be leveraged by the system to take the contours of the land in scene 220 into consideration if displaying the target line 424 (in which case the line 424 depicted in FIG. 4D could move up and down as it extends outward to show ground tracing that takes into account the contours of the scene 220 as known from the height data). The alignment line could be similarly displayed to account for ground tracking if desired by a practitioner (e.g., see FIGS. 6A and 6B discussed below).

While the example discussed above employs user input to identify the target 228 in the image data, it should also be understood that automated techniques for detecting the target 228 can be used if desired by a practitioner.

For example, the processor can use edge detection, corner detection, object recognition and/or other computer vision techniques to automatically detect the existence and location of typical targets for golf shots (such as hole flags). The object recognition can be based on machine learning (ML)

techniques where a classifier is trained using known images of target indicators such as hole flags to detect the presence of a hole flag in an image. An example of ML techniques that can be used in this regard include convolutional neural networks (CNNs) that are trained to recognize hole flags. However, it should be understood that a user may choose to use virtually anything as the target 228, as any desired landing point for a shot downfield from the ball 224 could serve as the user-defined target 228.

As another example, geo-location techniques could be used to determine the location for target 228. For example, on many golf courses, the holes will have known geo-locations, and global positioning system (GPS) data or other geo-location data can be used to identify the target 228 and translate the known GPS location of the target 228 to the coordinate space of the ground plane 402. The system may optionally use visual positioning system (VPS) data that helps localize the camera using known visual imagery of the landscape in scene 220. This ability to leverage VPS data will be dependent on the coverage of the relevant geographic area (e.g. a particular golf course) within available VPS data sets. This can help link the 3D spatial model of the AR processing system with real world geo-location data.

As still another example, crowd-sourced data can be used to define the location for target 228 in some circumstances. For instance, input from other users that indicates a location for a target 228 such as a hole on a golf course can be aggregated to generate reliable indications of where a given hole is located. For example, the average user-defined location for a hole as derived from a pool of users (e.g., a pool of recent users) can be used to automatically define the location for target 228 when the user is aiming a shot at the subject hole.

Once the target 228 and the target line 424 have been located in the 3D space of the system, the processor is able to evaluate the alignment of alignment device 226 based on the determined target location and the target line 424 (step 210). Toward this end, at step 210, the processor can determine whether the location of target 228 determined at step 208 falls along the target line vector 424 determined at step 206. To accomplish this, the processor can find the closest point along the target line 424 to the determined target location. The distance between this closest point along the target line 424 and the determined target line can serve as a measure of the alignment of the alignment device 226, where this measure quantifies the accuracy or inaccuracy as applicable of the subject alignment, where values close to zero would indicate accurate alignment while larger values would indicate inaccurate alignment (misalignment). If step 210 results in a determination that the location of target 228 falls along the target line vector 424 (in which the alignment measurement would be zero), then the processor can determine that the alignment device 226 is aligned with the target 228. If step 210 results in a determination that the location of target 228 does not fall along the target line vector 424 (in which case the alignment measurement would be a non-zero value), then there is a misalignment of the alignment device 226. However, it should be understood that, if desired by a practitioner, step 210 can employ a tolerance that defines a permitted amount of divergence between the location of target 228 and the target line 424 while still concluding that the alignment device 226 is properly aligned with the target. As examples, the tolerance value can be represented by physical distances (e.g., 2 feet) or angular values (e.g. 2 degrees) that serve as thresholds for evaluating whether a candidate orientation is "aligned" or "misaligned"; and the tolerance value can be hard-coded into the system or defined in response to user input, depending on the desires of a practitioner. Further still, the exact threshold values can be chosen and selected by practitioners or users based on empirical factors that are deemed by the practitioners or users to be helpful for practicing their shots.

Moreover, step 210 may include the processor quantifying an extent of misalignment between the target line 424 and location of target 228 if applicable. For example, the processor can compute an angular displacement as between the target line 424 and a line connecting the determined locations for the ball 224 and target 228. This angular displacement can represent the extent of misalignment indicated by the current orientation of the alignment device 226. Moreover, the processor can combine this angular displacement with a range to the target 228 to translate the angular displacement to a distance value (e.g., a misalignment of X feet at Y feet of range). In another example, the processor can compare the 3D coordinate of the determined location for target 228 and the nearest 3D coordinate on the target line vector 424 to compute the distance between these 3D coordinates.

Feedback can be provided to the user about the quality of alignment for the alignment device 226 based on the processing at step 210 (see steps 212 and 214). This feedback may be provided to the user via augmented reality (AR) and mixed reality (MR) techniques if desired by a practitioner. However, this need not be the case as discussed in greater detail below If step 210 results in a determination that the alignment device 226 is aligned with the target 228, then the process flow can proceed to step 212. At step 212, the processor provides feedback to the user indicating that the alignment device 226 is aligned with the target 228. This feedback can be simple binary feedback such as the display of an indicator or message on a GUI display which indicates that the alignment device 226 is properly aligned with the target 228. For example, the GUI display of image 440 can show the target line 424 in a particular color such as bright yellow if step 210 results in a determination that the alignment device 226 is aligned with the target 228. However, it should be understood that the GUI display could also provide a written message (e.g., "You are aligned") to similar effect. Still further, audio or haptic feedback could be provided at step 212 to indicate alignment if desired by a practitioner.

Further still, if desired by a practitioner, the displayed image 440 can provide additional feedback to the user that informs the user about changes in perspective as the user changes the orientation of the camera over time. For example, the color of target line 424 can vary based on how far off "perpendicular" the camera's 2D field of view perspective is relative to the target line 424. As the image plane of image 440 goes from less perpendicular to more perpendicular to the target line 424, the color of target line 424 in the image 440 can change from Color to Color Y (e.g., bright red when far away from perpendicular to bright green when perpendicular, with a bright yellow in the interim). This can help the user keep track of the view perspective provided by image 440. However, it should be understood that a practitioner may choose to omit this feedback if desired. Moreover, if this feedback is used in combination with the color-coded visual feedback discussed above for evaluating alignment/misalignment, the system can employ color coding that would distinguish between the colors used for indicating alignment/misalignment and the colors used for indicating perspective.

If step 210 results in a determination that the alignment device 226 is not aligned with the target 228, then the process flow can proceed to step 214. At step 214, the processor provides feedback to the user indicating that the alignment device 226 is misaligned with the target 228. This feedback can be simple binary feedback in visual form such as text and/or graphics. For example, the binary feedback can be a display of an indicator or message on a GUI display which indicates that the alignment device 226 is not aligned with the target 228 (e.g., "You are misaligned"). As another example, the misalignment feedback can be a display of graphics such as a red warning or X mark, a display of the target line 424 and/or alignment device 226 in a particular color (e.g., red), and/or a written, audio, or haptic feedback indicating the misalignment. In the example of FIG. 4E, the GUI display of image 440 can show a message 446 that indicates misalignment (e.g., a message about inaccuracy, which can be presented in a red color).

Further still, if step 210 provides a quantification of the misalignment, the feedback may be quantified feedback (e.g., "adjust the alignment stick by 4 degrees), visually displayed feedback (e.g., a visual indicator on a display screen that shows a user how the alignment device can be better aligned), and/or it may be generalized feedback (e.g., "tilt the alignment stick to the left" or even more simply "you are misaligned").

In the example of FIG. 4E, the message 446 can display this quantification in terms of distance and/or angle (e.g., feet, yards, meters, inches, degrees, etc.). For example, the message 446 can state that the alignment device 226 is producing an inaccuracy of 12.4 feet from the target 228 defined by point 442 at a range of 190.2 yards. For example, if the range to the target 228 is either known or presumed, knowledge of the angular disparity between the target line 424 and the target point 432 can allow for a computation of a physical distance between the target line 424 and the target 228 at this range. Moreover, it should be understood that this quantification of misalignment can be helpful for instances where the user is intentionally pointing the alignment device 226 off the target 228, which may occur in instances where the user is intending to practice fades/draws. In such a case, the user may intentionally aim the alignment device 226 to the left or right of the target 228 to gain familiarity and practice with the extent of a fade or draw on a shot.

The range to target 228 can be derived in any of a number of fashions. For example, user input could supply this range based on the user's knowledge or estimations. As another example, a laser range finder could be used to determine the range. As yet another example, GPS data, geo-location data, or other mapping data (which may include drone-derived mapping data) could be used to determine the range based on knowledge of a geo-location of the user (e.g., derived from the user's mobile device if the mobile device is GPS-equipped and enabled) and knowledge of a GPS position or other geo-location for the defined target 228. It should be appreciated that even relatively small angular misalignments of the alignment device 226 will produce fairly substantial distance misalignments when long ranges are taken into consideration. Accordingly, a feedback message 442 which quantifies an extent of misalignment can help the user gauge how far off the alignment device 226 may be guiding the user.

Figure 4F:
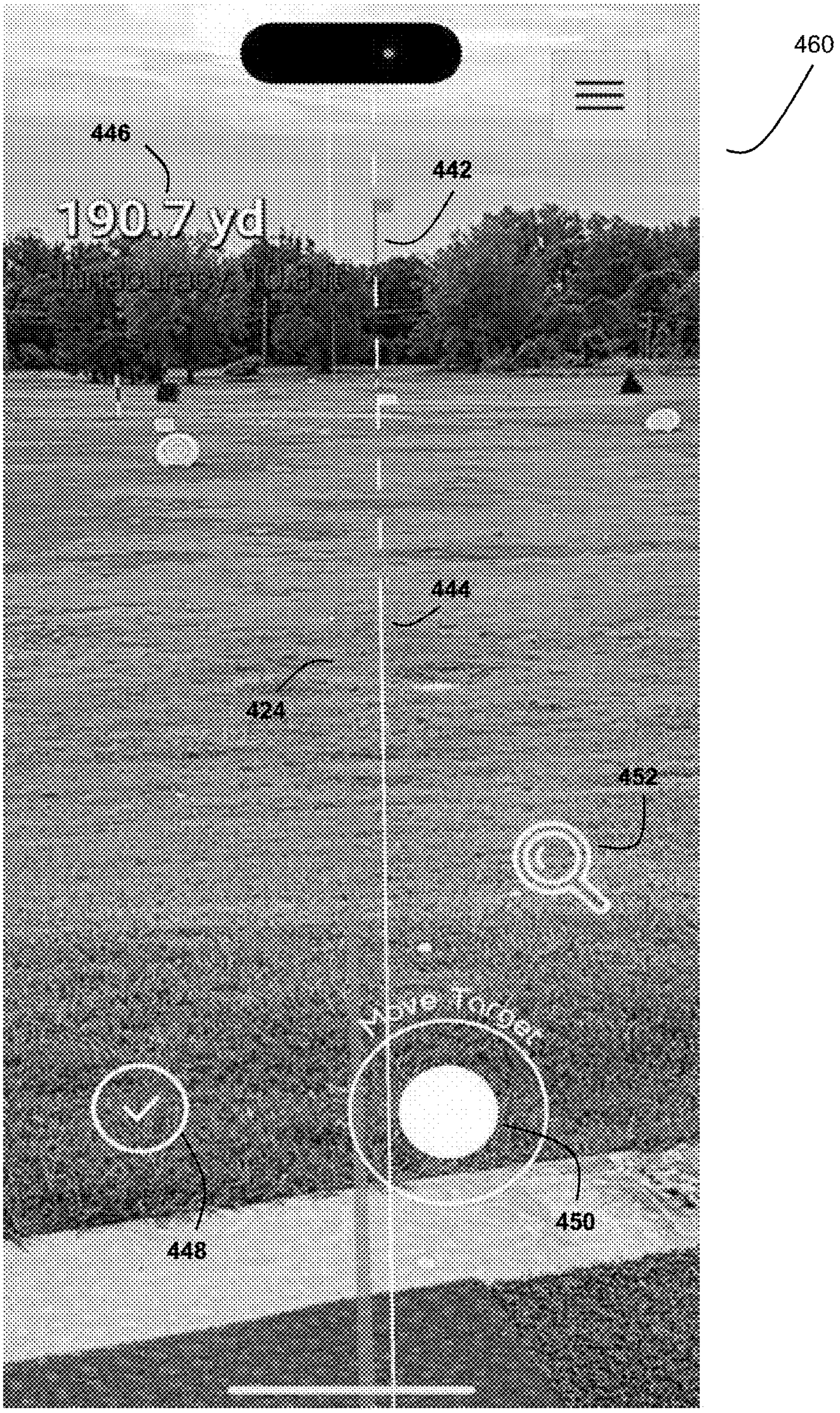

Furthermore, image 440 of FIG. 4E can also include user-interactive features that allow the user to re-position the target 228 if desired. This can permit the user to finetune the placement of target 228 and/or choose a new target 228 in the field of view. As shown by FIG. 4E, the image 440 can include a user-interactive button 448 that is selectable by a user to indicate that the user approves the alignment device and target placement. The image 440 can also include a user-interactive button 450 that is selectable by a user to initiate a process of fine-tuning the placement of target 228. In response to user selection of button 450, the user can fine-tune the location for point 442 in the image 440, which will re-define the target 228. The image 440 can also include a user-interactive button 452 that allows the user to zoom in on the image 440 for a better visualization of the region in the field of view where target 228 is located. Thus button 452 can be depicted on image 440 as a magnifying glass icon or the like, although this need not be the case. FIG. 4F shows an image 460 that is a zoomed in version of image 440 from FIG. 4E, where the zoomed image 460 of FIG. 4F shows the downfield target region in greater detail. This can allow the user to more accurately position point 442 and to more easily see how offline their target line is from the target. For example, FIG. 4F shows an example where point 442 has been re-positioned to reduce the misalignment of the target line 424 by approximately 2 feet relative to FIG. 4E. While the user-interactive features shown by FIGS. 4E and 4F are expected to be helpful for users, it should be understood that a practitioner may choose to omit some or all of these user-interactive features from the system.

Figure 4G:
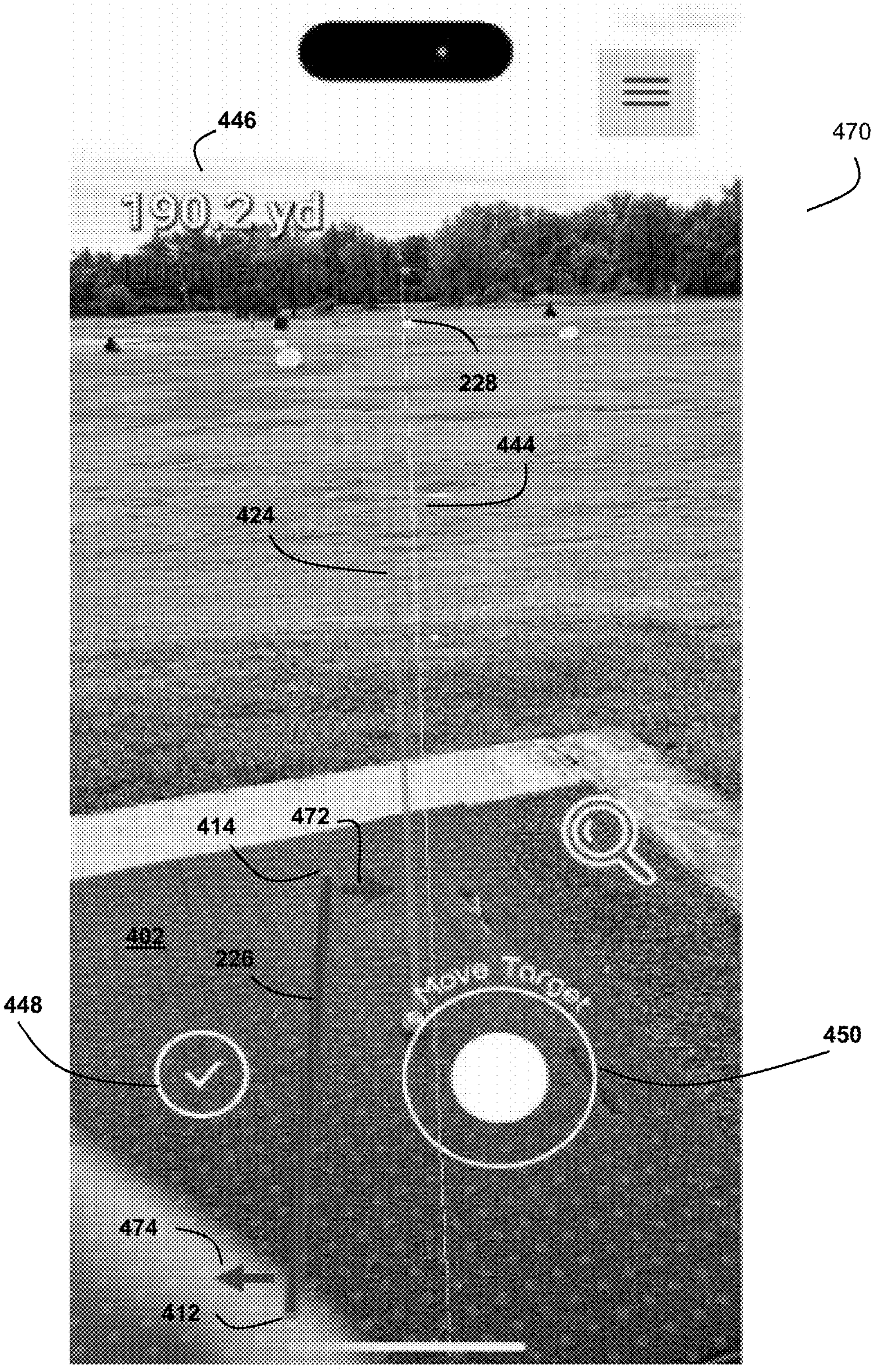

Feedback at step 214 may also take the form of an indication to the user of how the alignment device 226 can be re-oriented to improve its alignment relative to the target 228. An example of this is shown by FIG. 4G, which depicts an image 470 where the alignment device 226 is depicted in a particular color that signifies misalignment (e.g., red) and with arrows 472 and 474 that visually indicate to the user how the alignment device 226 can be re-oriented to improve its alignment to the target 228. These arrows 472 and 474 can indicate either a clockwise or counterclockwise rotation for the alignment device 226 depending on where the target line 424 lies relative to the target 228. For example, in the case of FIG. 4G, where the target line 424 falls to the left of the target 228, the visual indicator provided by FIG. 4G via arrows 472 and 474 can suggest a clockwise rotation of the alignment device 226 to shift the target line 424 to the right in image 470 closer to the target 228.

Accordingly, the FIG. 2 process flow shows an example of how image-based data processing techniques can be practically applied to solve the technical problem of achieving a proper alignment of an alignment device 226 with a target 228 when striking a golf ball 224 with a golf club. Moreover, it should be understood that the FIG. 2 process flow can be repeated as necessary by the user for additional shots, subsequent placements of the alignment device 226, subsequent placements of the ball 224, and/or subsequent selections of new targets 228.

It should be understood that the alignment assessment produced by the process flow of FIG. 2 is just an example, and a practitioner may choose to implement other techniques for evaluating the alignment of alignment device 226. FIGS. 5, 6A, 6B, 6C, and 7 show additional examples for aiding a golfer with respect to an alignment device 226.

Figure 5:
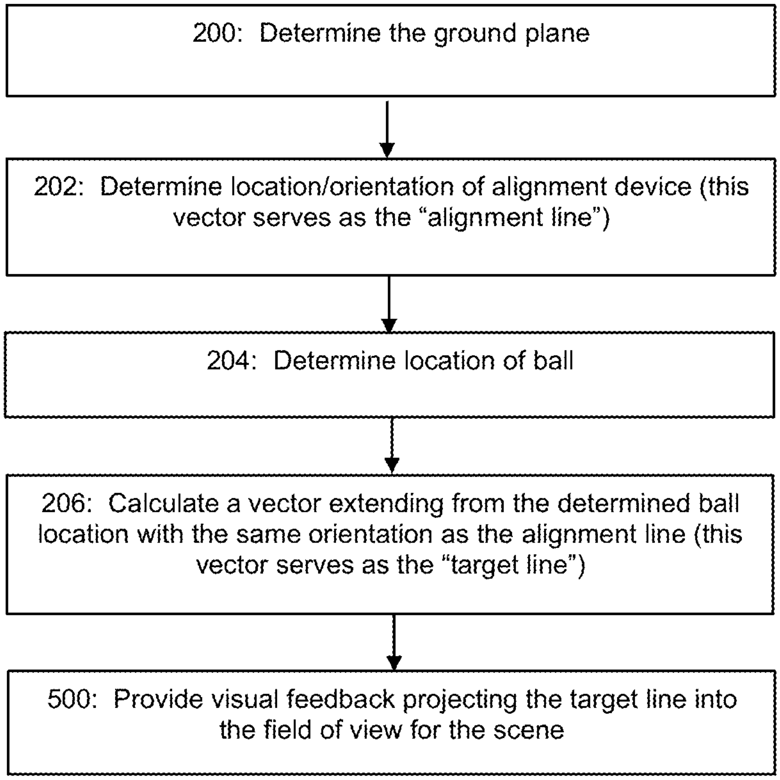
FIG. 5 depicts another example process flow for evaluating the alignment of an alignment device for a golfer.

In the example of FIG. 5, the process flow need not determine a location for target 228. Instead, steps 210-214 of FIG. 2 could be replaced with a feedback step 500 as shown by FIG. 5 where the target line 424 as shown by the examples of FIGS. 4C and 4D is overlaid on the GUI display of image(s) depicting the scene so that the user can visually assess whether the target line 424 is sufficiently pointing to where he or she intends to aim his or her shot. This approach to visual feedback can be useful in instances where the user can clearly see his or her intended target 228 so that the graphical display of target line 424 will allow the user to judge whether the alignment device 226 is positioned properly. In this example of FIG. 5, steps 200, 202, 204, and 206 can be performed as described above with respect to FIG. 2.

Figure 6A:
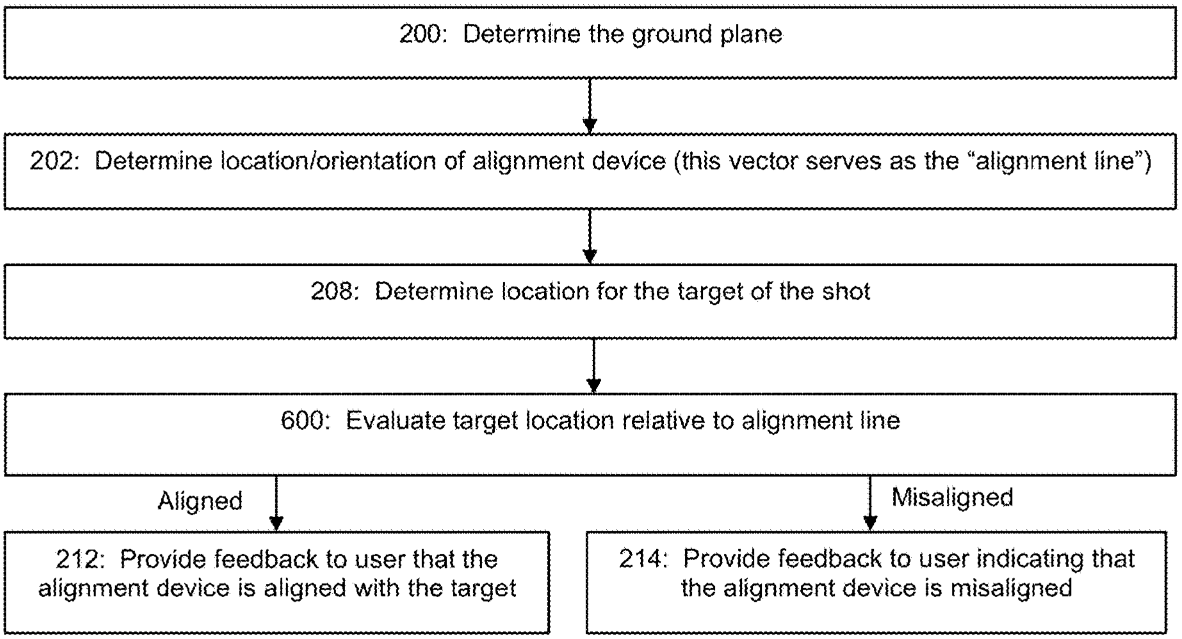
FIGS. 6A, 6B, and 6C depict additional example process flows for evaluating the alignment of an alignment device for a golfer.
Figure 6B:
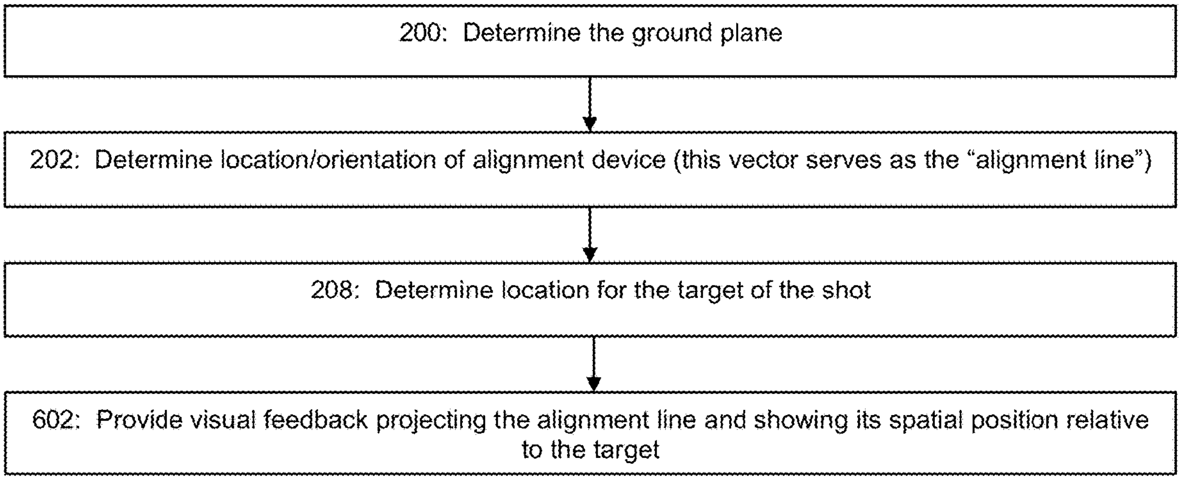
Figure 6C:
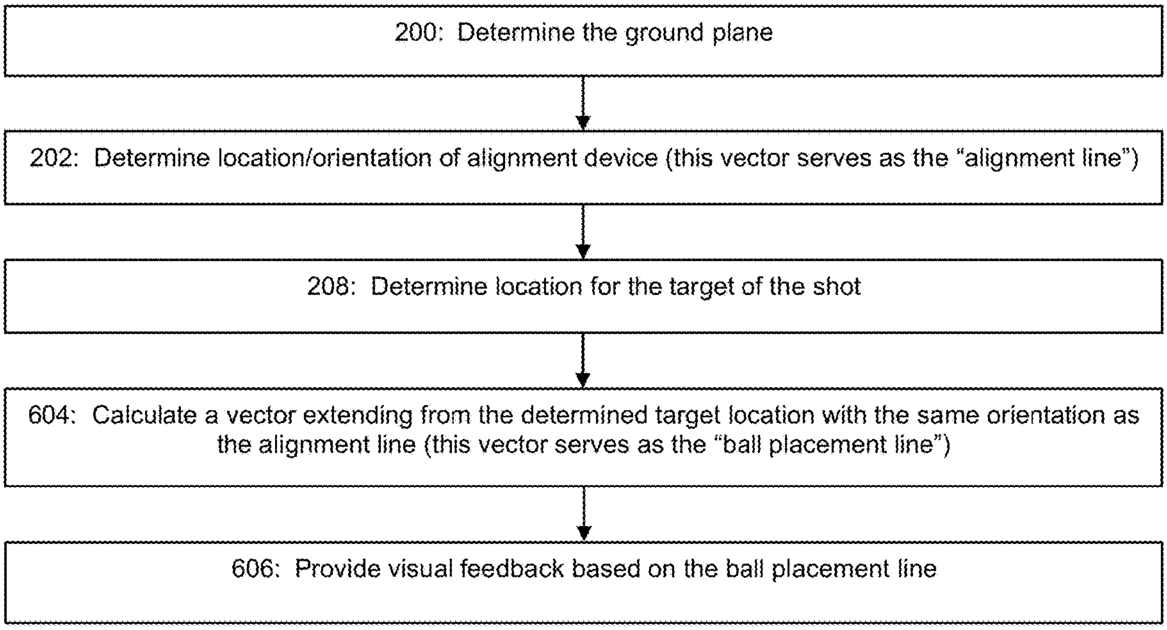

In the examples of FIGS. 6A, 6B, and 6C, the process flow need not determine the location for ball 224. As such, the process flows of FIGS. 6A, 6B, and 6C can be performed before or after the user has positioned the ball 224 on the ground in the scene 220 to be struck in the course of the shot.

The process flow of FIG. 6A can perform steps 200, 202, and 208 as discussed above. At this point, the processor will know the alignment line as per step 202 and the location for target 228 as per step 208. At step 600, the processor can evaluate the determined target location relative to the alignment line to assess the alignment of the alignment device 226. For example, this evaluation can take the form of a comparison between the alignment line and the determined target location. This comparison can quantify a displacement between the alignment line and the determined target location (e.g., the shortest distance between the alignment line and the determined target location). In making this evaluation, step 600 can take a presumed or defined offset between the ball 224 and the alignment device 226 into consideration. For example, step 600 may assume (or the user may define) that an offset exists where the alignment device is one foot to the left of the ball 224 (where it should be understood that other offset distances may be used). If the distance between the alignment line vector and the determined target location matches this offset, then step 600 can conclude that the alignment line is parallel to a line that connects the ball 224 with target 228 (and thus the alignment device 226 is aligned). Similarly, if the distance between the alignment line vector and the determined target location does not match this offset, then step 600 can conclude that the alignment line is not parallel to a line that connects the ball 224 with target 228 (and thus the alignment device 226 is misaligned). As discussed above, a tolerance can be taken into consideration when making this comparison and evaluating whether a match exists if desired by a practitioner. Furthermore, it should be understood that a known, presumed, or defined range to the target 228 can be taken into consideration when making this comparison. Further still, as part of defining the offset, the system can also determine where the golfer intends to place the ball 224 relative to the alignment device 226 to judge which side of the alignment line the target 228 should be assumed to be located. The placement of the ball 224 can be determined in response to user input (e.g., where the user specifies where he or she intends to place the ball 224) or can be determined automatically based on image analysis of the scene (e.g., by detecting the ball 224 relative to the alignment device 226 in the image data). Based on the alignment/misalignment determination at step 600, the processor can perform steps 212 and 214 in a similar fashion as discussed above for FIG. 2.

With the example of FIG. 6B, steps 200, 202, and 208 can be performed as described above. Relative to FIG. 6A, the process flow of FIG. 6B allows the user to compare the determined target location with the alignment line for the user to make an assessment regarding alignment (e.g., based on a visual comparison between the alignment line and the target 228). At step 602, the system can provide visual feedback to the user that projects the alignment line computed at step 202 outward into the scene 220 in a manner that shows its spatial position relative to the target 228. This visual feedback can inform the user about the quality of alignment for the alignment device 226 relative to the target 228. For example, if the displayed image shows that the projected alignment line is near the target 228, then the user can conclude that the alignment device 226 is properly aligned with the target. Similarly, if the displayed image shows that the projected alignment line is far from the target 228, then the user can conclude that the alignment device 226 needs to be re-positioned. After such re-positioning, the process flow of FIG. 6B can be repeated until a desired alignment is achieved. The visual feedback can also provide guidance to the user about where the user can place the ball on the ground relative to the alignment device 226. For example, if the visual feedback indicates the alignment line is a short distance from the target 228, the user can place the ball 224 the same or similar short distance from the alignment device 226. Moreover, the system can also quantify a displacement between the alignment line and the determined target location (e.g., the shortest distance between the alignment line and the determined target location), and the visual feedback can include a display of the distance. For example, the visual feedback can be a display of text (e.g., "Place your ball 1 foot to the right of the alignment stick") or a graphic that overlaps a suggested area for placement of the ball 224 (e.g., a point, line, circle, or other suitable shape showing where the ball 224 can be placed in the scene 220 to achieve an alignment to the target 228 as indicated by the alignment device 226). Further still, it should be understood that a practitioner may choose to implement the FIG. 6B process flow in a manner that omits step 208.

FIG. 6C shows another example where the system can recommend a ball placement to the user. Steps 200, 202, and 208 can proceed as discussed above. At step 604, the processor can calculate a vector that extends from the determined target location as per step 208 such that the calculated vector has the same orientation as the alignment line. This calculated vector can serve as a "ball placement line" because the vector indicates where the ball 224 can be placed to achieve an alignment with the target 228 consistent with the orientation of the alignment device 226. In this fashion, step 604 can be performed in a like manner as step 206 discussed above with respect to FIG. 2, albeit where the ball placement line is anchored to the determined target location as per step 208 (whereas the target line calculated at step 206 is anchored to the determined ball location as per step 204). At step 606, the system provides visual feedback to the user based on the ball placement line. For example, a displayed image of the scene 220 can include a graphical overlay of the ball placement line to show where the ball 224 can be positioned relative to the alignment device 226 in a manner that would achieve alignment to the target 228. If the displayed ball placement line as per step 606 shows that the ball 224 should be positioned too far away from the alignment device 226 for the alignment device 226 to be useful for the user, then the user could re-position the alignment device 226 until the visual feedback at step 606 indicates that the ball 224 should be placed suitably close to the alignment device 226 for effective user by the user. In another example, the visual feedback at step 606 can be a graphic display via AR of a suggested area for placement of the ball 224, where the suggested area is derived from the ball placement line. For example, the suggested area can be a point, line, circle, or other suitable zone shape that is on, encompasses, or is near (e.g., within a short distance such as 1 foot) the ball placement line and suggests an area near the alignment device 226 where the user can place the ball 224 and achieve substantial alignment with the target 228 in consideration of the alignment line.

Figure 7:
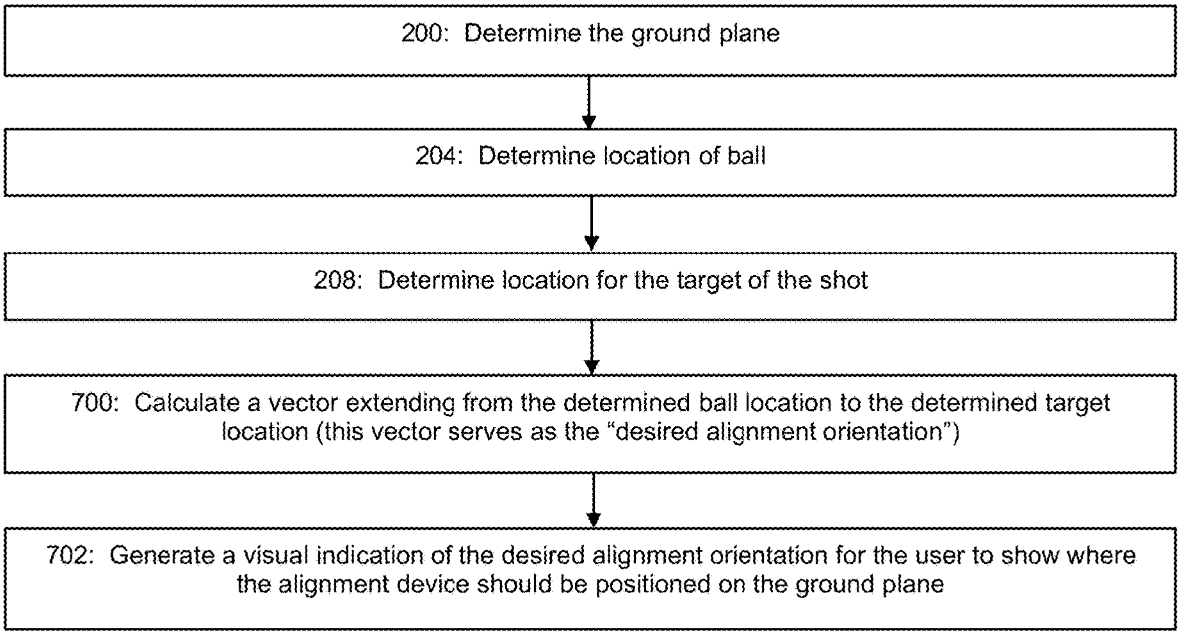
FIG. 7 depicts an example process flow for evaluating how an alignment device can be positioned to achieve a desired alignment to the target.

In the example of FIG. 7, the user need not pre-position the alignment device 226 and the processor need not determine the orientation of the alignment device 226. Instead, the processor can determine a recommended orientation for the alignment device 226 that would achieve an alignment with the target 228. In this regard, the process flow of FIG. 7 can perform steps 200, 204, and 208 as discussed above with respect to FIG. 2 to determine the ground plane 402, determine the location for ball 224, and determine the location for target 228. Then, at step 700, the processor calculates a vector extending from the determined ball location as per step 204 to the determined target location as per step 208. This vector represents the "desired alignment orientation" for the alignment device 226 as it should be understood that the user will want to place the alignment device 226 on the ground plane 402 with the same orientation as the desired alignment orientation. At step 702, the system generates a visual indication of the desired alignment orientation for the user to show the user where the alignment device 226 should be positioned on the ground plane 402.

In an example such as one where the user is interacting with the system via a mobile device such as a smart phone, the visual indication at step 702 can be a graphical overlay of the desired alignment orientation on the displayed image of the scene to show where the alignment device 226 should be positioned. This graphical overlay can be a line depicted in the scene via AR that replicates at least a portion of the desired alignment orientation vector (or a line that is parallel to the desired alignment orientation vector). For example, the graphical overlay line can be a colored line (e.g., bright yellow or some other color) to show where the desired alignment orientation is located in the scene depicted by the image. Moreover, if desired by a practitioner, once a physical alignment device 226 is placed in the field of view, the system can also provide visual feedback on whether the alignment device 226 is aligned to the target 228 (using techniques such as those discussed above, such as the visual feedback explained in connection with FIG. 4G, where the alignment device 226 is depicted in a color such as red with arrows to indicate how to re-orient it to improve alignment to target 228).

This approach for the visual indication at step 702 is expected to also be effective for example embodiments where the system works in conjunction with virtual reality (VR) equipment (e.g., wearable devices such as VR goggles, glasses, or headsets). With this approach, the VR equipment can display via AR a virtual alignment device with the proper orientation, negating the need for a physical alignment device 226.

In another example where the system includes a device with light projection capabilities positioned near the user, the device can include a light projector that is capable of steering and projecting light into the scene so that a virtual alignment device is illuminated on the ground plane 402 of the scene. This light projection can also provide the user with a reliable virtual alignment device, which also can negate the need for the traditional physical alignment device 226.

The process flows of FIGS. 2, 5, 6A, 6B, 6C, and 7 can be carried out by one or more processors. In an example embodiment, the one or more processors can be included within a mobile device 300 such as that shown by FIG. 3A.

Figure 3A:
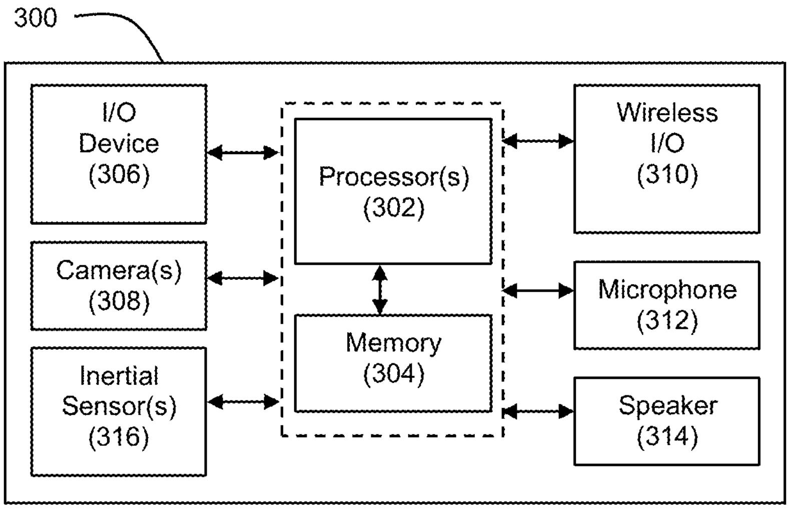
FIG. 3A depicts an example mobile device that can be used to carry out the alignment evaluation techniques described herein.

The mobile device 300 of FIG. 3A can be a smart phone (e.g., an iPhone, a Google Android device, a Blackberry device, etc.), tablet computer (e.g., an iPad), wearable device (e.g., VR equipment such as VR goggles, VR glasses, or VR headsets), or the like. It should be understood that VR equipment as used herein encompasses and includes augmented reality (AR) equipment (e.g., AR equipment such as Apple Vision Pro headsets). It should be further understood that the term AR as used herein encompasses and includes mixed reality (MR). The mobile device 300 can include an I/O device 306 such as a touchscreen or the like for interacting with a user. However, it should be understood that any of a variety of data display techniques and data input techniques could be employed by the I/O device 306. For example, to receive inputs from a user, the mobile device 300 need not necessarily employ a touchscreen—it could also or alternatively employ a keyboard or other mechanisms.

The mobile device 300 may also comprise one or more processors 302 and associated memory 304, where the processor(s) 302 and memory 304 are configured to cooperate to execute software and/or firmware that supports operation of the mobile device 300. Furthermore, the mobile device 300 may include one or more cameras 308. Camera(s) 308 may be used to generate the images used by the example process flows of FIGS. 2, 5, 6A, 6B, 6C, and/or 7. Images generated by the camera(s) 308 may be accessed by the processor(s) 302 via memory 304 (as memory 304 can store the image data produced by the camera(s) 308). Further still, the mobile device 300 may include wireless I/O 310 for sending and receiving data, a microphone 312 for sensing sound and converting the sensed sound into an electrical signal for processing by the mobile device 300, and a speaker 314 for converting sound data into audible sound. The wireless I/O 310 may include capabilities for making and taking telephone calls, communicating with nearby objects via near field communication (NFC), communicating with nearby objects via RF, and/or communicating with nearby objects via BlueTooth, although this need not necessarily be the case. Further still, the mobile device 300 may include one or more inertial sensors 316 (e.g., accelerometers and/or gyroscopes) that can be used to track movement and tilting of the mobile device 300 over time, and the inertial data (e.g., accelerometer data and/or gyroscope data) can be used to support tracking and translations of pixel locations in the image data generated by camera(s) 308 to 3D coordinates in the reference space of the system.

Figure 3B:
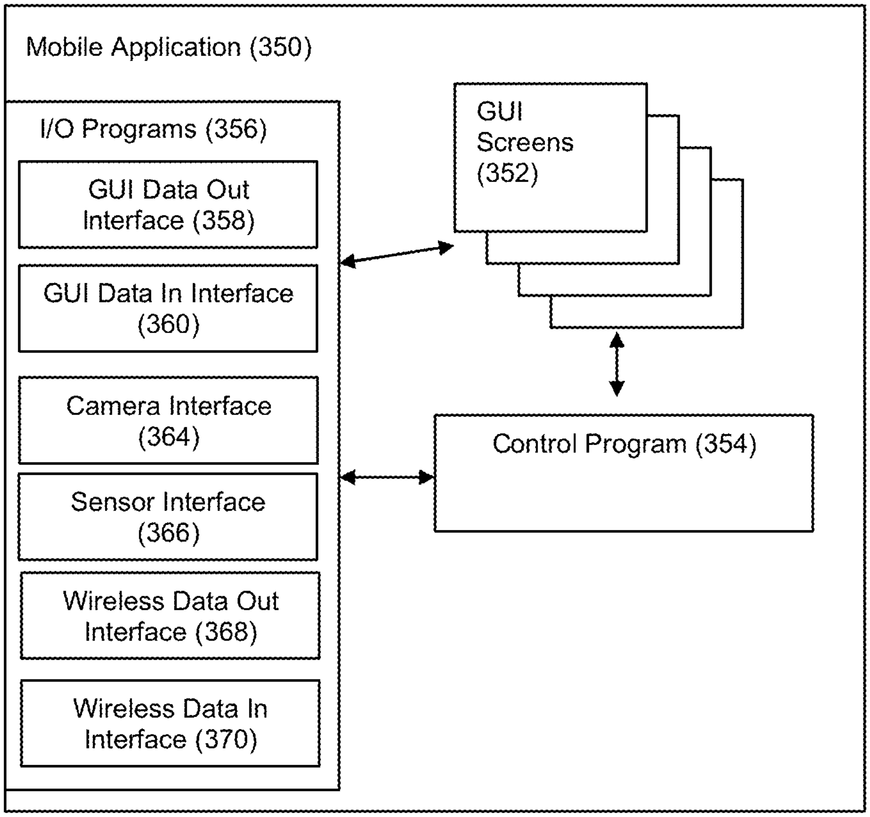
FIG. 3B depicts an example mobile application that can be used to implement the alignment evaluation techniques described herein.

FIG. 3B depicts an exemplary mobile application 350 for an exemplary embodiment. Mobile application 350 can be installed on the mobile device 300 for execution by processor(s) 302. The mobile application 350 can comprise a plurality of processor-executable instructions for carrying out the process flows of FIGS. 2, 5, 6A, 6B, 6C, and/or 7, where the instructions can be resident on a non-transitory computer-readable storage medium such as a computer memory. The instructions may include instructions defining a plurality of GUI screens for presentation to the user through the I/O device 306 (e.g., see the images presented by FIGS. 4A-4G which can be presented via GUI screens of the mobile application 350). The instructions may also include instructions defining various I/O programs 356 such as:

- a GUI data out interface 358 for interfacing with the I/O device 306 to present one or more GUI screens 352 to the user;
- a GUI data in interface 360 for interfacing with the I/O device 306 to receive user input data therefrom;
- a camera interface 364 for interfacing with the camera(s) 308 to communicate instructions to the camera(s) 308 for capturing an image in response to user input or other commands and to receive image data corresponding to a captured image from the camera(s) 308 (e.g., where the mobile application 350 can interface with the camera(s) 308 by providing commands that cause the camera(s) to begin generating images and by reading image data produced by the camera(s) from memory 304);

- a sensor interface 366 for interfacing with one or more sensors of the mobile device 300 such as one or more inertial sensors 316 to obtain data that allows the mobile application 350 to track the pose, tilt, and orientation of the camera(s) 308 when image data is generated.
- a wireless data out interface 368 for interfacing with the wireless I/O 310 to provide the wireless I/O with data for communication over a wireless network (such as a cellular and/or WiFi network); and
- a wireless data in interface 370 for interfacing with the wireless I/O 310 to receive data communicated over the wireless network to the mobile computing device 300 for processing by the mobile application 350.

The instructions may further include instructions defining a control program 354. The control program can be configured to provide the primary intelligence for the mobile application 350, including orchestrating the data outgoing to and incoming from the I/O programs 356 (e.g., determining which GUI screens 352 are to be presented to the user).

While FIGS. 3A and 3B show an example of a system where the one or more processors that implement the process flows of FIGS. 2, 5, 6A, 6B, 6C, and/or 7 are implemented in a mobile device 300, it should be understood that the one or more processors that carry out these process flows need not be implemented solely within a mobile device 300 or even within a mobile device 300 at all.

Figure 8A:
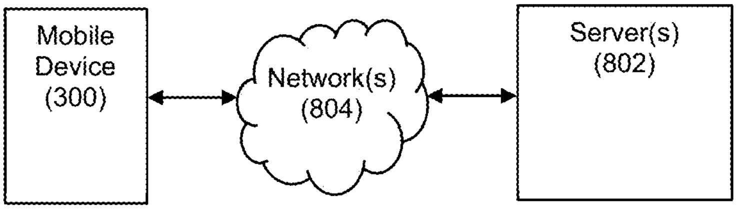
FIGS. 8A, 8B, and 8C depict additional examples of systems which can be used to carry out the alignment evaluation techniques described herein.

For example, as shown by FIG. 8A, the mobile device 300 may interact with one or more servers 802 via one or more networks 804 (e.g., cellular and//or WiFi networks in combination with larger networks such as the Internet) to carry out the process flow. A practitioner may choose to distribute the processing operations of the system across multiple processors so that some operations are performed by processor(s) 302 within the mobile device 300 while other operations are performed by one or more processors within one or more servers 802. For example, a practitioner may choose to implement computationally-intensive operations on servers 802 in order to alleviate processing burdens on the processor(s) 302 of the mobile device 300.

Figure 8B:
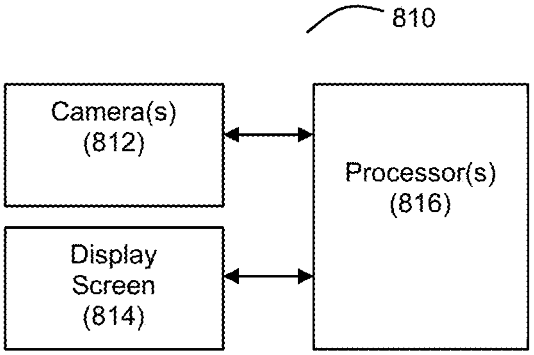

As another example, as shown by FIG. 8B, the one or more processors can be included as part of a system 810 that includes one or more cameras 812 and a display screen 814, where the camera(s) 812 can be positioned to image the scene that includes the ball 224, alignment device 226, and target 228 in order to feed image data to processor(s) 816, where processor(s) 816 carry out the processing operations described herein. The display screen 814 can display the images and results of the alignment evaluations. The display screen 814 can be a standalone component in the system or it can be integrated into a larger appliance. Moreover, the display screen 814 can be a touchscreen interface through which users can provide inputs as discussed above. However, it should be understood that the system 810 may alternatively include alternate techniques for receiving user input, such as a keyboard, user-selectable buttons, etc. The various components of system 810 can communicate data and commands between each other via wireless and/or wired connections.

In an example embodiment, the system 810 can take the form of a launch monitor. Launch monitors are often used by golfers to image their swings and generate data about the trajectory of the balls struck by their shots. By incorporating the alignment evaluation features described herein, a ball launch monitor can be augmented with additional functionality that is useful for golfers. In a launch monitor embodiment, one or more processors resident in the launch monitor itself can perform the image processing operations described herein to support alignment evaluations; or the one or more processors 816 may include one or processors on a user's mobile device 300 that performs some or all of the alignment evaluation tasks and communicates alignment data to the launch monitor for presentation to the user. In still another example, the launch monitor could be configured to communicate launch data to the mobile device 300 for display of the launch data via the mobile application 350 in coordination with the alignment data. In another example embodiment, the system 810 can take the form of a monitor or display screen that is augmented with processing capabilities to provide alignment assistance as described herein.

Further still, a launch monitor (such as the one disclosed by the above-referenced Kiraly patent) can be augmented to use the spatial model data generated by the system to adjust its internal calculations regarding features such as azimuth feedback (e.g., launch direction, horizontal launch angle, or side angle) and/or elevation changes. For example, the mobile device 300 can be used to also image the launch monitor and detect or determine the launch monitor's orientation with respect to the 3D spatial model maintained by the mobile application 350. By also detecting or determining the launch monitor's orientation in 3D space, the mobile device 300 could communicate data to the launch monitor that allows the launch monitor to better orient itself to the target 228 (which can improve the ability of the launch monitor to calculate accurate azimuth values).

Figure 8C:
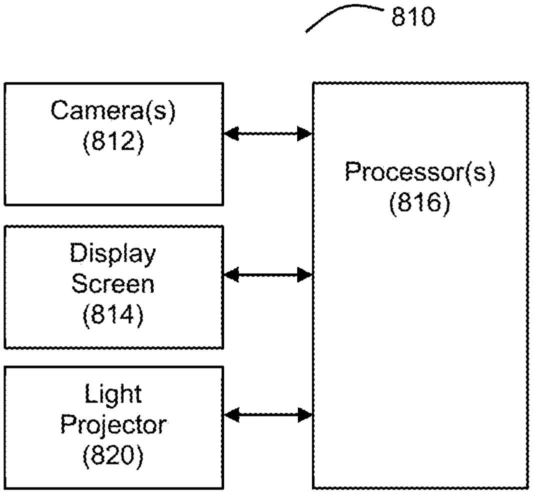

Furthermore, as shown by FIG. 8C, the system 810 can also include a light projector 820 which will allow the system to project a virtual alignment device into the scene as described in connection with FIG. 7. The light projector 820 can generate a steerable light beam for projecting light toward desired locations in the field of view for the camera(s) 812. As an example, the light projector 820 can include steerable mirrors that can scan light toward desired locations and/or mechanical actuators for changing the orientation of the light source from which light is projected. In an example embodiment, the light projector 820 can be a standalone light projector 820 that communicates with the processor(s) 816 in order for the processor(s) 816 to control the projection of the virtual alignment device. In another example embodiment, the system 810 of FIG. 8C can take the form of equipment such as range finding equipment (e.g., a laser range finder (LRF)) or a VR projection system that has been augmented to also provide alignment assistance as described herein. In another example embodiment, the system 810 of FIG. 8C can be deployed as part of an augmented ball launch monitor if desired by a practitioner.

While the invention has been described above in relation to example embodiments, various modifications may be made thereto that still fall within the invention's scope.

For example, it should be understood that the process flows of FIGS. 2, 5, 6A, 6B, 6C, and 7 are examples; and practitioners may choose to implement alternate process flows for evaluating alignments using the techniques described herein. Further still, it should understood that practitioners may choose to vary the order of the steps described in the process flows of FIGS. 2, 5, 6A, 6B, 6C, and 7 while still achieving desired alignment guidance (e.g., with respect to FIG. 2 and FIG. 5; step 204 could be performed before step 202; with respect to FIG. 2, step 208 could be performed before steps 202 and/or 204; with respect to FIGS. 6A, 6B, and 6C, step 208 could be performed before step 202; with respect to FIG. 7, step 208 could be performed before step 204, etc.).

Figure 9:
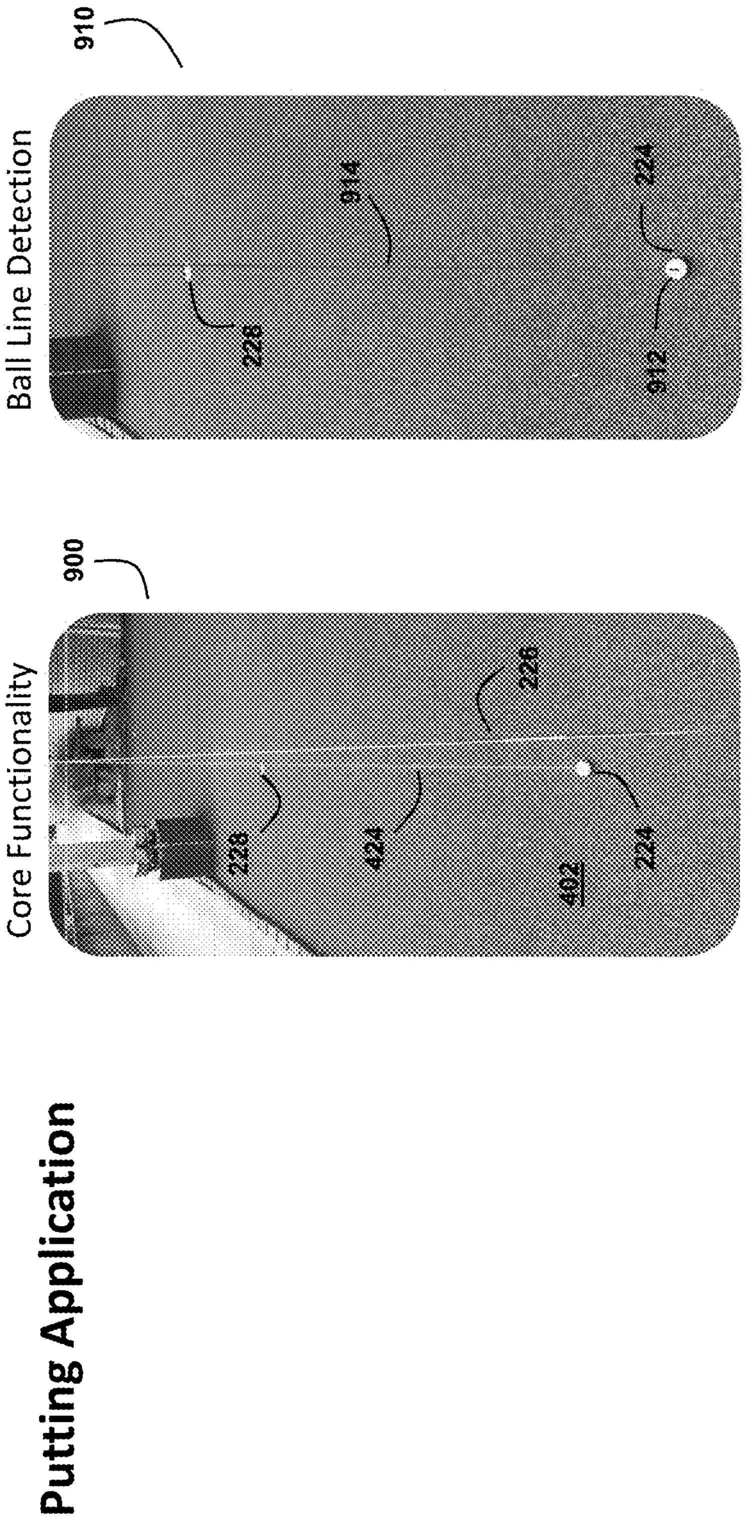
FIG. 9 depicts example images showing an application of the alignment evaluation techniques described herein to putting.

As another example, while the examples illustrated above in connection with FIGS. 4A-4G are focused on longer golf shots where the golfer will be striking the ball 224 with a driver, wood, or iron, it should be understood that that the techniques described herein can also be used in connection with shorter range shots such as chips, pitches, and putts using clubs such as wedges and putters. FIG. 9 shows an example image 900 where the techniques of FIG. 2 are applied in the context of putting.

Moreover, to support putting, many golfers will use balls with lines on them (or will mark their balls with lines), where the golfers will place the ball on the ground so that the line is intended to be aimed in the direction the golfer intends to putt the ball to help the golfer visualize a putting line. The techniques described herein can be adapted to evaluate whether such a line on the ball is aligned with the target 228. An example of this is shown by image 910 of FIG. 9. With this approach, rather than detecting the orientation of an alignment device 226 that is separate from the ball 224 (or in additional to detecting the orientation of an alignment device 226), the system can determine the orientation of the line 912 on the ball 224 relative to the frame of reference for the scene. In this regard, the line 912 on the ball 224 can itself serve as an alignment device for the golfer. The detection of this line 912 can serve as the basis for computing a target line vector 914 that extends the line 912 outward into the scene. Furthermore, for the avoidance of doubt, it should be understood that the target 228 may not necessarily be the hole in the putting example because the golfer may target his or her putt elsewhere due to the break/slope of the green. The detection of line 912 can be accomplished in response to user input that identifies the line 912 in the image 910 or by automated object recognition/computer vision techniques that would operate to detect the ball 224 in the image data along with the line 912 depicted on the ball 224. The system can then assess whether this line 912 and/or vector 914 is aligned with the target 228 using techniques such as those discussed above. For example, the process flows of FIGS. 6A, 6B, and 6C can be employed, where line 912 serves as the alignment device 226.

As another example, a user may choose to use multiple alignment devices 226, and a practitioner may choose to configure the system to support evaluating the alignment of multiple alignment devices 226. For example, if a user is using more than one alignment device 226, the user could select which alignment device 226 he or she would like to utilize as the primary alignment device to determine the target line 424. An example of this is shown by FIG. 10A.

Figures 10A, 10B:
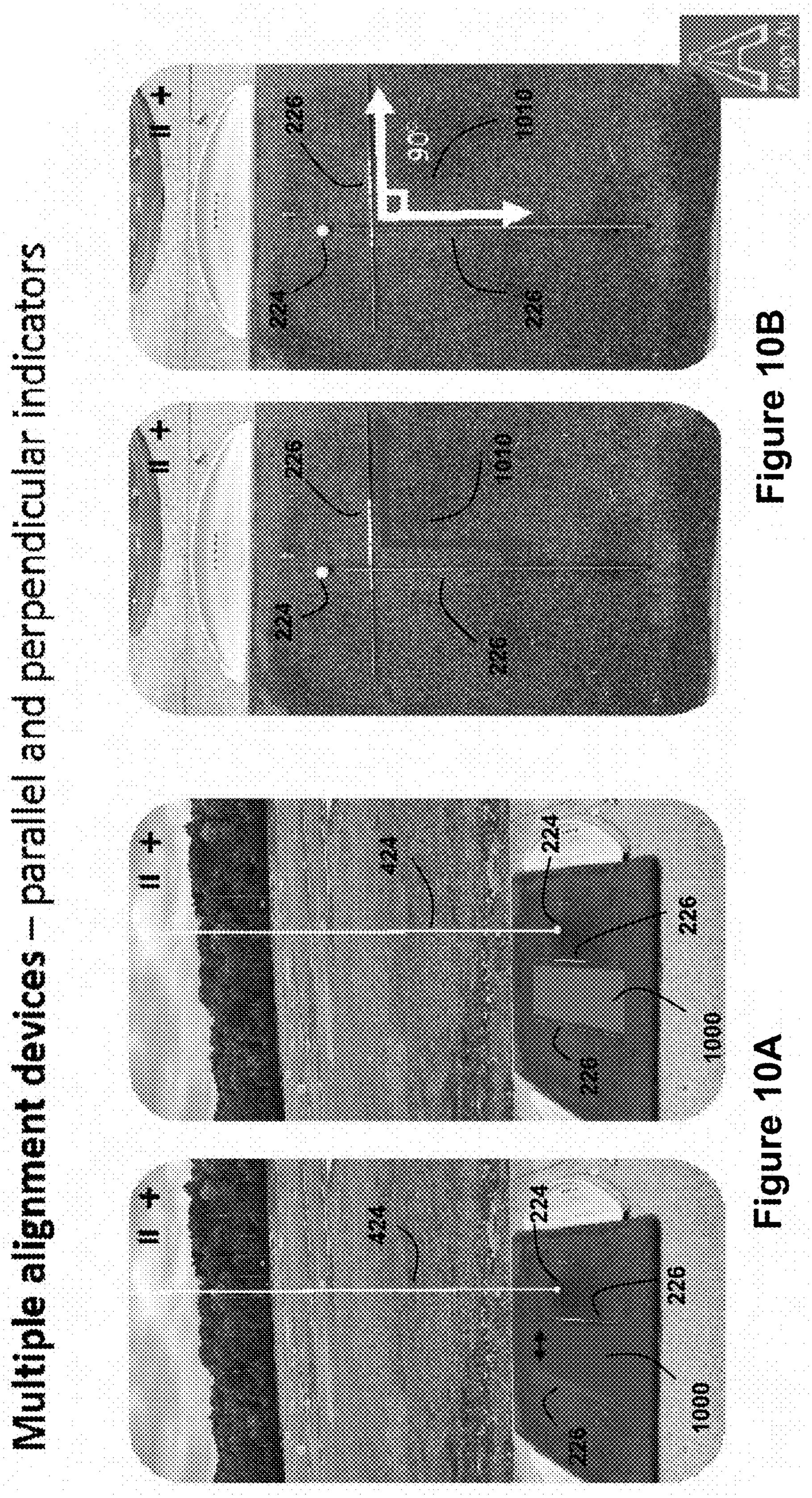
FIGS. 10A and 10B depict example images showing an application of the alignment evaluation techniques described herein when multiple alignment devices are used.

In the example of FIG. 10A, the user is attempting to orient two alignment devices 226 in parallel with each other, where one of the alignment devices 226 can serve as the primary alignment device 226 that defines the target line vector 424. The displayed image can include visual feedback 1000 that signifies the relative alignment between the two alignment devices 226. In the example of the left side of FIG. 10A, the visual feedback 1000 indicates that the two alignment devices 226 are not parallel and an adjustment is needed. The evaluation of whether the two alignment devices 226 are parallel can be accomplished by determining the orientation of both alignment devices 226 and comparing these orientations with each to determine whether they are parallel. The right side of FIG. 10A shows the visual feedback 1000 changing to indicate that parallel alignment between the two alignment devices 226 has been achieved. Moreover, the system can be configured to test for whether the alignment devices 226 are parallel in response to user selection of a "II" button or the like that can be displayed on the screen. Moreover, once a target 228 is identified, the system can more seamlessly manage multiple alignment devices 226 and provide visual feedback on whether the alignment devices 226 are aligned at the target 228 (using techniques such as those discussed above, like the visual feedback explained in connection with FIG. 4G, where the devices are depicted in a color such as red with arrows to indicate how to re-orient them to improve alignment to target 228).

In the example of FIG. 10B, the system determines whether two alignment devices 226 are perpendicular. The displayed image can include visual feedback 1010 that signifies the relative alignment between the two alignment devices 226. In the example of the left side of FIG. 10B, the visual feedback 1010 indicates that the two alignment devices 226 are not perpendicular and an adjustment is needed. For example, the visual feedback 1010 can identify the angle between the two alignment devices 226 (95 degrees in the example of the left side of FIG. 10B). The evaluation of whether the two alignment devices 226 are perpendicular can be accomplished by determining the orientation of both alignment devices 226 and comparing these orientations with each to determine whether they are perpendicular. The right side of FIG. 10B shows the visual feedback 1010 changing to indicate that perpendicular alignment between the two alignment devices 226 has been achieved. Moreover, the system can be configured to test for whether the alignment devices 226 are perpendicular in response to user selection of a "+" button or the like that can be displayed on the screen.

Figure 11:
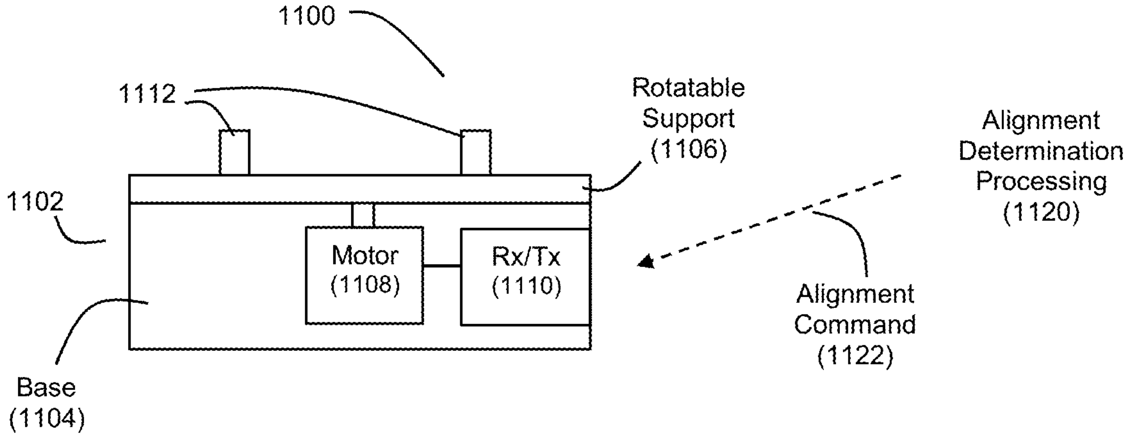
FIG. 11 depicts an example system that can automatically adjust an orientation of an alignment device based on the alignment evaluation techniques described herein.

As another example, the system can include automated mechanisms for adjusting the alignment of the alignment device 226 if desired by a practitioner. For example, stepper motors, actuators, or other motive capabilities could be employed on or connected to alignment devices (together with data communication capabilities) to adjust alignment devices to better alignments if indicated by the alignment data generated by the system. FIG. 11 depicts an example of such an automated alignment system 1100, where the alignment device 226 can be positioned on an actuator 1102, where the actuator 1102 comprises a base 1104 and rotatable support 1106 on which the alignment device 226 can be positioned. The base 1104 can include a motor 1108 that operates to controllably rotate the rotatable support 1106 to new angular orientations in response to alignment commands 1122 that are received from remote alignment determination processing operations 1120 (where these operations can be carried out by one or more processors as described above). The base 1104 can include a wireless receiver or transceiver 1110 that interfaces the actuator 1102 with the remote processing operations 1120 via the alignment commands 1122. The alignment commands 1122 can be wireless signals that specify how the motor 1108 is to be actuated to achieve a desired amount of rotation for the rotatable support 1106 so as to achieve a desired alignment of the alignment device 226. The rotatable support 1106 can include brackets 1112 or other mechanisms for connecting the alignment device 226 with the actuator 1102 such as slots, connectors, adhesives, and the like. Thus, in operation, the actuator 1102 can be positioned on the ground plane 402 with an alignment device 226 connected to the rotatable support 1106 in a particular orientation. From there, a device such as a mobile device can wirelessly transmit alignment commands 1122 to the base 1104 that will cause the motor 1108 to rotate the alignment device 226 to a desired aligned orientation via rotation of the rotatable support 1106.

These and other modifications to the invention will be recognizable upon review of the teachings herein.

What is claimed is:

1. An article of manufacture comprising:

a plurality of instructions that are executable by one or more processors and resident on a non-transitory computer-readable storage medium, wherein the instructions are configured for execution to cause the one or more processors to perform a plurality of operations, wherein the operations comprise:

interfacing with one or more cameras to receive image data about a scene, wherein the image data comprises one or more images of the scene, wherein the one or more images comprise a plurality of pixels, the pixels having pixel coordinates in the one or more images, wherein the image data includes depictions of an alignment device and a target in the scene;

translating a plurality of the pixel coordinates applicable to the alignment device to 3D coordinates in a frame of reference based on a spatial model of the scene;

determining an orientation of the alignment device relative to the frame of reference based on the translating;

generating alignment data based on the determined alignment device orientation, wherein the generated alignment data is indicative of a relative alignment for the alignment device in the scene with respect to a golf shot for striking a golf ball toward the target, wherein the operations to generate the alignment data include calculating a vector within the spatial model that extends into the scene toward the target, wherein the vector exhibits the determined orientation of the alignment device; and generating, based on the generated alignment data, feedback for presentation to a user before the golf shot, wherein the generated feedback is (1) indicative of whether the alignment device is aligned with the target and (2) comprises an augmented reality (AR) or mixed reality (MR) overlay of at least a portion of the calculated vector on an image of the scene to provide the golfer with feedback for repositioning the alignment device before the golf shot if the generated feedback indicates a misalignment of the alignment device with respect to the golf shot.

2. The article of manufacture of claim 1 wherein the instructions for determining the alignment device orientation comprise a plurality of instructions configured for:

identifying the alignment device in the image data in response to user input that identifies at least two points on the alignment device; and calculating the alignment device orientation based on the identified alignment device.

3. The article of manufacture of claim 1 wherein the instructions for determining the alignment device orientation comprise a plurality of instructions configured for:

automatically detecting the alignment device in the image data based on computer vision; and calculating the alignment device orientation based on the detected alignment device.

4. The article of manufacture of claim 3 wherein the computer vision comprises a trained machine learning classifier that has been trained on a plurality of images that depict alignment devices.

5. The article of manufacture of claim 1 wherein the image data further includes a depiction of the golf ball in the scene, and wherein the instructions further comprise a plurality of instructions configured for:

determining a location for the golf ball relative to the frame of reference based on the image data; and wherein the calculated vector comprises a line that includes the determined golf ball location and exhibits the determined orientation of the alignment device.

6. The article of manufacture of claim 5 wherein the instructions for determining the golf ball location comprise a plurality of instructions configured for:

identifying the golf ball in the image data in response to user input that identifies at least one point on the golf ball; and determining the golf ball location based on the identified golf ball.

7. The article of manufacture of claim 5 wherein the instructions for determining the golf ball location comprise a plurality of instructions configured for:

automatically detecting the golf ball in the image data based on computer vision; and determining the golf ball location based on the detected ball.

8. The article of manufacture of claim 7 wherein the computer vision comprises a trained machine learning classifier that has been trained on a plurality of images that depict golf balls.

9. The article of manufacture of claim 5 wherein the instructions further comprise a plurality of instructions configured for:

determining a location for the target relative to the frame of reference based on the image data;

comparing the determined target location with the calculated vector; and determining, based on the comparison between the determined target location and the calculated vector, whether the calculated vector intersects with the determined target location, and wherein the generated alignment data further comprises data that indicates whether the calculated vector intersects with the determined target location.

10. The article of manufacture of claim 9 wherein the instructions for determining the target location comprise a plurality of instructions for:

identifying the target in the image data in response to user input that identifies at least one point on the target; and determining the target location based on the identified target.

11. The article of manufacture of claim 9 wherein the instructions for determining the target location comprise a plurality of instructions for:

automatically detecting the target in the image data based on computer vision, geographic or map data, and/or crowd-sourced data; and determining the target location based on the detected target.

12. The article of manufacture of claim 5 wherein the AR or MR overlay comprises a visualization of the line, wherein the visualization extends from the determined golf ball location to the target.

13. The article of manufacture of claim 1 wherein the generated feedback comprises one of more visual features that vary based on whether the generated alignment data indicates alignment or misalignment.

14. The article of manufacture of claim 1 wherein the generated feedback comprises one of more visual features that indicate a correction to the alignment device for improving alignment of the alignment device if the alignment data indicates a misalignment of the alignment device.

15. The article of manufacture of claim 1 wherein the generated alignment data further comprises data that quantifies an extent of misalignment if the generated alignment data indicates the alignment device is misaligned, and wherein the generated feedback comprises one of more visual features that present the data that quantifies the extent of misalignment if the generated alignment data indicates the alignment device is misaligned.

16. The article of manufacture of claim 1 wherein the instructions further comprise a plurality of instructions configured for:

determining a ground plane for the scene based on the image data, wherein the determined ground plane establishes the frame of reference.

17. The article of manufacture of claim 16 wherein the instructions use Simultaneous Localization and Mapping (SLAM) to track positions for the determined ground plane and the determined alignment device orientation as new image data is processed.

18. The article of manufacture of claim 1 wherein the calculated vector comprises a line that includes the alignment device and exhibits the determined orientation of the alignment device.

19. The article of manufacture of claim 18 wherein the AR or MR overlay comprises a visualization of the line, wherein the visualization extends from the alignment device into the scene toward the target.

20. The article of manufacture of claim 19 wherein the instructions further comprise a plurality of instructions configured for:

determining a location for the target relative to the frame of reference based on the image data;

comparing the determined target location with the calculated vector; and determining, based on the comparison between the determined target location and the calculated vector, whether the calculated vector intersects with the determined target location, and wherein the generated alignment data further comprises data indicative of whether the calculated vector intersects with the determined target location.

21. An article of manufacture comprising:

a plurality of instructions that are executable by one or more processors and resident on a non-transitory computer-readable storage medium, wherein the instructions are configured for execution to cause the one or more processors to perform a plurality of operations, wherein the operations comprise:

interfacing with one or more cameras to receive image data about a scene, wherein the image data comprises one or more images of the scene, wherein the one or more images comprise a plurality of pixels, the pixels having pixel coordinates in the one or more images, wherein the image data includes depictions of an alignment device and a target in the scene;

translating a plurality of the pixel coordinates applicable to the alignment device to 3D coordinates in a frame of reference based on a spatial model of the scene;

determining an orientation of the alignment device relative to the frame of reference based on the translating;

determining a location for the target relative to the frame of reference based on the image data;

generating alignment data based on the determined alignment device orientation and the determined target location, wherein the generated alignment data is indicative of a relative alignment for the alignment device in the scene with respect to a golf shot for striking a golf ball toward the target, wherein the operations to generate the alignment data include calculating a vector that extends from the determined target location so that the calculated vector is parallel with the determined alignment device orientation; and generating feedback indicative of the alignment data for presentation to a user, wherein the feedback comprises an augmented reality display of (1) the calculated vector in the scene and/or (2) a suggested area in the scene for positioning of the golf ball, wherein the suggested area is derived from the calculated vector.

22. The article of manufacture of claim 1 wherein the instructions for the translating operation use Simultaneous Localization and Mapping (SLAM).

23. The article of manufacture of claim 1 wherein the alignment device comprises an alignment stick placed on the ground.

24. The article of manufacture of claim 1 wherein the alignment device comprises a line on the golf ball.

25. The article of manufacture of claim 1 wherein the alignment device comprises a plurality of alignment devices.

26. The article of manufacture of claim 1 wherein the instructions define a mobile application for execution by a mobile device.

27. The article of manufacture of claim 1 wherein the one or more processors comprise a plurality of processors, and wherein the instructions include a plurality of instructions for execution by different ones of the processors.

28. A method comprising:

imaging a scene using one or more cameras to generate image data about the scene, wherein the image data comprises one or more images of the scene, wherein the one or more images comprise a plurality of pixels, the pixels having pixel coordinates in the one or more images, wherein the image data includes depictions of an alignment device and a target in the scene;

translating a plurality of the pixel coordinates applicable to the alignment device to 3D coordinates in a frame of reference based on a spatial model of the scene;

determining an orientation of the alignment device relative to the frame of reference based on the translating;

generating alignment data based on the determined alignment device orientation, wherein the generated alignment data is indicative of a relative alignment for the alignment device in the scene with respect to a golf shot for striking a golf ball toward the target, wherein the alignment data generating step includes calculating a vector within the spatial model that extends into the scene toward the target, wherein the vector exhibits the determined orientation of the alignment device; and generating, based on the generated alignment data, feedback for presentation to a user before the golf shot, wherein the generated feedback is (1) indicative of whether the alignment device is aligned with the target and (2) comprises an augmented reality (AR) or mixed reality (MR) overlay of at least a portion of the calculated vector on an image of the scene to provide the golfer with feedback for re-positioning the alignment device before the golf shot if the generated feedback indicates a misalignment of the alignment device with respect to the golf shot; and wherein the translating, alignment data generating, and feedback generating steps are performed by one or more processors.

29. A system comprising:

one or more cameras configured to image a scene to generate image data about the scene, wherein the image data comprises one or more images of the scene, wherein the one or more images comprise a plurality of pixels, the pixels having pixel coordinates in the one or more images, wherein the image data includes depictions of an alignment device and a target in the scene; and one or more processors configured to:

translate a plurality of the pixel coordinates applicable to the alignment device to 3D coordinates in a frame of reference based on a spatial model of the scene;

determine an orientation of the alignment device relative to the frame of reference based on the translation;

generate alignment data based on the determined alignment device orientation, wherein the generated alignment data is indicative of a relative alignment for the alignment device in the scene with respect to a golf shot for striking a golf ball toward the target, wherein the alignment data generation includes calculating a vector within the spatial model that extends into the scene toward the target, wherein the vector exhibits the determined orientation of the alignment device; and generate, based on the generated alignment data, feedback for presentation to a user before the golf shot, wherein the generated feedback is (1) indicative of whether the alignment device is aligned with the target and (2) comprises an augmented reality (AR) or mixed reality (MR) overlay of at least a portion of the calculated vector on an image of the scene to provide the golfer with feedback for re-positioning the alignment device before the golf shot if the generated feedback indicates a misalignment of the alignment device with respect to the golf shot.

30. The system of claim 29 further comprising a mobile device, wherein the one or more processors is or are part of the mobile device.

31. The system of claim 29 further comprising a launch monitor, wherein the one or more processors is or are part of the launch monitor.

32. The system of claim 29 further comprising virtual reality (VR) equipment, wherein the one or more processors is or are part of the VR equipment.

33. The system of claim 29 further comprising a range finder, wherein the one or more processors is or are part of the range finder.

34. The article of manufacture of claim 1 wherein the operations further comprise:

determining a location for the target relative to the frame of reference based on the image data; and wherein the calculated vector comprises a line that includes the determined target location and exhibits the determined orientation of the alignment device.

35. The article of manufacture of claim 34 wherein the AR or MR overlay comprises a visualization of the line, wherein the visualization extends from the determined target location to a location for the golf ball.

36. The article of manufacture of claim 1 wherein the image data comprises a first image that depicts the alignment device in the scene and a second image that depicts the target in the scene.

37. The article of manufacture of claim 1 wherein the one or more processors are configured to perform the alignment data generating and feedback generating operations as new image data is received from the one or more cameras over time so that the generated feedback updates in real-time even if the alignment device is re-positioned before the golf shot.

38. The article of manufacture of claim 1 wherein the one or more cameras comprise one or more mobile device cameras that are maneuverable while the image data is acquired, and wherein the generated feedback adjusts to movements of the one or more mobile device cameras.

39. The article of manufacture of claim 1 wherein the AR or MR overlay comprises a line visualization that exhibits the determined orientation, wherein the line visualization (1) projects outward from the alignment device as depicted in the image used for the generated feedback, (2) aligns with a location depicted in the image used for the generated feedback that corresponds to where the golf ball is to be struck as part of the golf shot, or (3) aligns with the target.

40. The article of manufacture of claim 1 wherein the alignment device comprises an alignment stick, a golf club, a range divider, a wood stake, or an edge of a hitting mat that has been positioned on the ground near a location where the golf shot.

41. The system of claim 30 wherein the one or more cameras are part of the mobile device, and wherein the mobile device includes a screen on which the generated feedback is displayed.

* * * * *